US007343453B2

(12) United States Patent
Prahlad et al.

(10) Patent No.: US 7,343,453 B2
(45) Date of Patent: Mar. 11, 2008

(54) HIERARCHICAL SYSTEMS AND METHODS FOR PROVIDING A UNIFIED VIEW OF STORAGE INFORMATION

(75) Inventors: Anand Prahlad, East Brunswick, NJ (US); Srinivas Kavuri, South Plainfield, NJ (US); Andre Duque Madeira, Laurence Harbor, NJ (US); Norman R. Lunde, Middletown, NJ (US); Alan G. Bunte, Monmouth Beach, NJ (US); Andreas May, Marlboro, NJ (US); Jeremy Schwartz, Red Bank, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

(21) Appl. No.: 11/120,619

(22) Filed: May 2, 2005

(65) Prior Publication Data

US 2006/0053261 A1    Mar. 9, 2006

Related U.S. Application Data

(60) Provisional application No. 60/567,178, filed on Apr. 30, 2004.

(51) Int. Cl.
*G06F 12/08* (2006.01)
(52) U.S. Cl. ........................ 711/117; 711/154; 711/162
(58) Field of Classification Search ...................... None
See application file for complete search history.

(56) References Cited

U.S. PATENT DOCUMENTS

| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |

(Continued)

FOREIGN PATENT DOCUMENTS

EP          0259912          3/1988

(Continued)

OTHER PUBLICATIONS

Armstead et al., "Implementation of a Campus-wide Distributed Mass Storage Service: The Dream vs. Reality," *IEEE*, 1995, pp. 190-199.

(Continued)

*Primary Examiner*—Gary Portka
(74) *Attorney, Agent, or Firm*—Perkins Coie LLP

(57) ABSTRACT

The present invention provides systems and methods for data storage. A hierarchical storage management architecture is presented to facilitate data management. The disclosed system provides methods for evaluating the state of stored data relative to enterprise needs by using weighted parameters that may be user defined. Also disclosed are systems and methods evaluating costing and risk management associated with stored data.

20 Claims, 15 Drawing Sheets

U.S. PATENT DOCUMENTS

| | | |
|---|---|---|
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalla et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton et al. |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,658,526 B2 | 12/2003 | Nguyen et al. |
| 7,082,441 B1 * | 7/2006 | Zahavi et al. ............... 707/200 |
| 7,085,904 B2 * | 8/2006 | Mizuno et al. ............. 711/162 |
| 7,096,315 B2 * | 8/2006 | Takeda et al. .............. 711/111 |

FOREIGN PATENT DOCUMENTS

| | | |
|---|---|---|
| EP | 0405926 | 1/1991 |
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| WO | WO-95/13580 | 5/1995 |
| WO | WO-99/12098 | 3/1999 |

OTHER PUBLICATIONS

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System For Write-Once Optical Disks," *IEEE Computer*, vol. 21, No. 6, pp. 11-22 (1988) (see in particular figure 5 in p. 15 and recitation in claim 5).

Rosenblum et al., "The Design and Implementation of a Log-Structured File System," *Operating Systems Review SIGOPS*, vol. 25, No. 5, New York, US, pp. 1-15 (May 1991).

* cited by examiner

Client Summary – PEONY.COMMVAULT.COM [macy]

| Client Name | | | Mount Path | Type | Volume Name |
|---|---|---|---|---|---|
| ADMINS | C:\WINNT | | CIFS | C:\ | |
| C$ | C:\ | | CIFS | C:\ | |
| C$ | C:\ | | CIFS | C:\ | |
| WWWROOT | C:\INETPUB\WWWROOT | | CIFS | C:\ | |

Secondary Storage Information

As of Tuesday, April 26, 2005 4:00:20 PM

Note: Synthetic Full operations are not considered for Coverage

Oracle Database

Data Size: [0 MB] for Yesterday ( Mon 04/25 08:00AM – Tue 04/25 07:59AM )
[0 MB] for last week ( Mon 04/18 08:00AM – Mon 04/25 07:59AM )

Subclients Information

Deleted Subclient

| Instance | Subclient | Scheduled | Storage Policy | Days Elapsed Since Last Full Coverage | Days Elapsed Since Last Coverage |
|---|---|---|---|---|---|
| man9i | default | No | SP_MagLibrary2_2 | 25 | 25 |
| man9i | (command line) | No | SP_MagLibrary2_2 | No Coverage | No Coverage |
| man9i | oracle_db_901 | Yes | SP_MagLibrary2_2 | 19 | 19 |
| man9i | oracle-db-1 | No | | No Coverage | No Coverage |
| man9i | oracle-db-2 | No | SP_MagLibrary2_2 | 25 | 25 |
| man9i | oracle-th-3 | No | | No Coverage | No Coverage |
| man9i | offline-full | Yes | SP_MagLibrary2_2 | 20 | 20 |
| man9i | selective online full | | SP_MagLibrary2_2 | | |
| man9i | oracle-sub | Yes | SP_MagLibrary2_2 | 24 | 19 |

| Last Data Protection Type | Billable Entity |
|---|---|
| Full | Engineering |
| Full | Engineering |
| Full | Engineering |
| Full | Engineering |
| Full | Engineering |
| Incremental | Engineering |
| Online Full | Engineering |
| Incremental | Engineering |

Subclient / Storage Policy Copy Relationship

Fig. 2b

Data Size Detail Information

| Agent Type | Tue 04/19 | Wed 04/20 | Thu 04/21 | Weekend 04/22 - 04/24 | Mon 04/25 | Tue 04/26 |
|---|---|---|---|---|---|---|
| Windows NT File System | 0 MB | 0 MB | 0 MB | 0 MB | 0 MB | 0 MB |
| SQL Server | 0 MB | 0 MB | 0 MB | 0 MB | 0 MB | 0 MB |
| Exchange Mailbox | 0 MB | 0 MB | 0 MB | 0 MB | 0 MB | 0 MB |
| Exchange Database | 0 MB | 0 MB | 0 MB | 0 MB | 0 MB | 0 MB |
| Novell Directory Services | 0 MB | 0 MB | 0 MB | 0 MB | 0 MB | 0 MB |
| Windows 2000 File System | 41.0 MB | 44.0 MB | 44.0 MB | 133.0 MB | 44.0 MB | 90.0 MB |
| NetWare File System | 0 MB | 0 MB | 0 MB | 0 MB | 0 MB | 0 MB |
| Exchange 2000 Mailbox | 0 MB | 0 MB | 0 MB | 0 MB | 0 MB | 0 MB |
| SQL Server 2000 | 0 MB | 0 MB | 0 MB | 0 MB | 0 MB | 0 MB |
| HP-UX File System | 0 MB | 0 MB | 3.0 MB | 0 MB | 0 MB | 1.0 MB |
| Solaris File System | 0 MB | 0 MB | 0 MB | 0 MB | 0 MB | 0 MB |
| AIX File System | 0 MB | 0 MB | 0 MB | 0 MB | 0 MB | 0 MB |
| Oracle Database | 0 MB | 0 MB | 0 MB | 0 MB | 0 MB | 0 MB |
| Linux File System | 0 MB | 0 MB | 0 MB | 0 MB | 0 MB | 0 MB |
| Unix Tru64 64-bit File System | 0 MB | 0 MB | 0 MB | 0 MB | 0 MB | 0 MB |
| Windows 2003 32-bit File System | 0 MB | 0 MB | 0 MB | 0 MB | 0 MB | 0 MB |
| Windows 2003 64-bit File System | 0 MB | 0 MB | 0 MB | 0 MB | 0 MB | 0 MB |

HIERARCHICAL SYSTEMS AND METHODS FOR PROVIDING A UNIFIED VIEW OF STORAGE INFORMATION

RELATED APPLICATIONS

This application claims the benefit of U.S. Provisional Application No. 60/567,178 filed Apr. 30, 2004.

This application is related to the following patents and pending applications, each of which is hereby incorporated herein by reference in its entirety:

- application Ser. No. 09/354,058, titled HIERARCHICAL BACKUP AND RETRIEVAL SYSTEM, filed Jul. 15, 1999,
- U.S. Pat. No. 6,418,478, titled PIPELINED HIGH SPEED DATA TRANSFER MECHANISM, issued Jul. 9, 2002,
- application Ser. No. 09/610,738, titled MODULAR BACKUP AND RETRIEVAL SYSTEM USED IN CONJUNCTION WITH A STORAGE AREA NETWORK, filed Jul. 6, 2000,
- U.S. Pat. No. 6,542972 titled LOGICAL VIEW AND ACCESS TO PHYSICAL STORAGE IN MODULAR DATA AND STORAGE MANAGEMENT SYSTEM, issued Apr. 1, 2003,
- U.S. Pat. No. 6,658,436, titled LOGICAL VIEW AND ACCESS TO DATA MANAGE BY A MODULAR DATA AND STORAGE MANAGEMENT SYSTEM, issued Dec. 2, 2003,
- application Ser. No. 10/658,095, titled DYNAMIC STORAGE DEVICE POOLING IN A COMPUTER SYSTEM, filed Sep. 9, 2003,
- Application Ser. No. 10/262,556, titled METHOD FOR MANAGING SNAPSHOTS GENERATED BY AN OPERATING SYSTEM OR OTHER APPLICATION, filed Sep. 30, 2002,
- application Ser. No. 60/460,234, SYSTEM AND METHOD FOR PERFORMING STORAGE OPERATIONS IN A COMPUTER NETWORK, filed Apr. 3, 2003, and
- application Ser. No. 10/877,831, HIERARCHICAL SYSTEM AND METHOD FOR PERFORMING STORAGE OPERATIONS IN A COMPUTER NETWORK, filed Jun. 25, 2004.

COPYRIGHT NOTICE

A portion of the disclosure of this patent document contains material that is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND OF THE INVENTION

The invention disclosed herein relates generally to performing storage operations on electronic data in a computer network. More particularly, the present invention relates to integrating storage-related operations for a computer network according to a specified arrangement of storage operation cells.

Current storage management systems employ a number of different methods to perform storage operations on electronic data. For example, data can be stored in primary storage as a primary copy or in secondary storage as various types of secondary copies including, as a backup copy, a snapshot copy, a hierarchical storage management copy ("HSM"), as an archive copy, and as other types of copies.

A primary copy of data is generally a production copy or other "live" version of the data which is used by a software application and is generally in the native format of that application. Primary copy data may be maintained in a local memory or other high-speed storage device that allows for relatively fast data access if necessary. Such primary copy data is typically intended for short term retention (e.g., several hours or days) before some or all of the data is stored as one or more secondary copies, for example to prevent loss of data in the event a problem occurred with the data stored in primary storage.

Secondary copies include point-in-time data and are typically for intended for long-term retention (e.g., weeks, months or years depending on retention criteria, for example as specified in a storage policy as further described herein) before some or all of the data is moved to other storage or discarded. Secondary copies may be indexed so users can browse and restore the data at another point in time. After certain primary copy data is backed up, a pointer or other location indicia such as a stub may be placed in the primary copy to indicate the current location of that data.

One type of secondary copy is a backup copy. A backup copy is generally a point-in-time copy of the primary copy data stored in a backup format as opposed to in native application format. For example, a backup copy may be stored in a backup format that is optimized for compression and efficient long-term storage. Backup copies generally have relatively long retention periods and may be stored on media with slower retrieval times than other types of secondary copies and media. In some cases, backup copies may be stored at on offsite location.

Another form of secondary copy is a snapshot copy. From an end-user viewpoint, a snapshot may be thought as an instant image of the primary copy data at a given point in time. A snapshot generally captures the directory structure of a primary copy volume at a particular moment in time, and also preserves file attributes and contents. In some embodiments, a snapshot may exist as a virtual file system, parallel to the actual file system. Users typically gain a read-only access to the record of files and directories of the snapshot. By electing to restore primary copy data from a snapshot taken at a given point in time, users may also return the current file system to the prior state of the file system that existed when the snapshot was taken.

A snapshot may be created instantly, using a minimum of file space, but may still function as a conventional file system backup. A snapshot may not actually create another physical copy of all the data, but may simply create pointers that are able to map files and directories to specific disk blocks.

In some embodiments, once a snapshot has been taken, subsequent changes to the file system typically do not overwrite the blocks in use at the time of snapshot. Therefore, the initial snapshot may use only a small amount of disk space needed to record a mapping or other data structure representing or otherwise tracking the blocks that correspond to the current state of the file system. Additional disk space is usually only required when files and directories are actually modified later. Furthermore, when files are modified, typically only the pointers which map to blocks are copied, not the blocks themselves. In some embodiments, for example in the case of copy-on-write snapshots, when a block changes in primary storage, the block is copied to secondary storage before the block is overwritten in primary storage and the snapshot mapping of file system data is updated to reflect the changed block(s) at that particular point in time. An HSM copy is generally a copy of the primary copy data, but typically includes only a subset of the primary copy data that meets a certain criteria and is usually stored in a format other than the native application format. For example, an HSM copy might include only that data from the primary copy that is larger than a given size threshold or older than a given age threshold and that is stored in a backup format. Often, HSM data is removed from the primary copy, and a stub is stored in the primary copy to indicate its new location. When a user requests access to the HSM data that has been removed or migrated, systems use the stub to locate the data and often make recovery of the data appear transparent even though the HSM data may be stored at a location different from the remaining primary copy data.

An archive copy is generally similar to an HSM copy, however, the data satisfying criteria for removal from the primary copy is generally completely removed with no stub left in the primary copy to indicate the new location (i.e., where it has been moved to). Archive copies of data are generally stored in a backup format or other non-native application format. In addition, archive copies are generally retained for very long periods of time (e.g., years) and in some cases are never deleted. Such archive copies may be made and kept for extended periods in order to meet compliance regulations or for other permanent storage applications.

In some embodiments, application data over its lifetime moves from more expensive quick access storage to less expensive slower access storage. This process of moving data through these various tiers of storage is sometimes referred to as information lifecycle management ("ILM"). This is the process by which data is "aged" from more forms of secondary storage with faster access/restore times down through less expensive secondary storage with slower access/restore times, for example, as the data becomes less important or mission critical over time.

Examples of various types of data and copies of data are further described in the above-referenced related applications that are hereby incorporated by reference in their entirety. One example of a system that performs storage operations on electronic data that produce such copies is the QiNetix storage management system by CommVault Systems of Oceanport, N.J.

The QiNetix system leverages a modular storage management architecture that may include, among other things, storage manager components, client or data agent components, and media agent components as further described in U.S. patent application Ser. No. 10/818,749 which is hereby incorporated herein by reference in its entirety. The QiNetix system also may be hierarchically configured into backup cells to store and retrieve backup copies of electronic data as further described in U.S. patent application Ser. No. 09/354,058 which is hereby incorporated by reference in its entirety.

Backup systems may be improved by providing systems and methods to hierarchically configure backup cells to perform certain other types of storage operations including snapshot copies, HSM copies, archive copies, and certain other types of copies of electronic data.

A further shortcoming of prior art storage systems relates to the lack of meaningful integration between and among HSM systems and Storage Resource Management ("SRM") systems. SRM systems are typically concerned with monitoring the health, status, and other information associated with primary copies of data (e.g., live or production line copies). For example, an SRM application may monitor the capacity of a volume storing a primary copy of data and the rate of data transfer relative to the available storage of that volume. In contrast, HSM systems are typically concerned with data transport to secondary storage, such as the parameters and particulars associated with the storage and migration of secondary copy data as opposed to monitoring of information associated with primary copy data. HSM systems are thus generally directed to secondary copies and other archival data volumes. For example, an HSM system may be directed to migrating or otherwise transferring data to a secondary copy.

Existing SRM systems, however, do not meaningfully interoperate with existing HSM systems across an enterprise or network. For example, although an SRM system may monitor the available space of a primary storage volume and note when its capacity is being reached (or exceeded), the SRM system itself is typically incapable of initiating any substantive corrective or preventative action. Similarly, because an HSM system is typically concerned only with migrating and managing secondary copy data to secondary volumes and data stores, it is therefore generally unaware of conditions or problems associated with primary copy data. In the past, to address this problem, users have implemented two distinct SRM and HSM systems and manually handled issues discovered by SRM systems when HSM support or other input is required or vice versa. Thus, in view of the foregoing, it would be desirable to provide systems and methods that more meaningfully integrate SRM and HSM components in storage management systems to perform autonomous or pseudo-autonomous storage operations and other operations.

SUMMARY OF THE INVENTION

The present invention addresses, among other things, the shortcomings discussed above in performing storage operations on electronic data in a computer network.

In accordance with some aspects of the present invention, a computerized system is provided for performing storage operations on electronic data, the system including: a first storage operation cell including a first storage manager component, a media agent component, and a data agent component; and a second storage manager component programmed to control the first storage manager component.

In some embodiments disclosed herein, data from a plurality of storage operation cells is received and normalized to identify storage characteristics, attributes, or methods. In some embodiments, data from an SRM storage operation cell is correlated to data from an HSM storage operation cell, for example, for identifying identical network elements having a different name in each storage operation cell.

In some embodiments, the systems and methods disclosed herein detect and mitigate risks in a storage network. The system may identify a storage-related characteristic and may perform an action if the characteristic satisfies a particular risk criteria. Risk criteria may be indicated by storage policies, storage definitions, or other information located in a storage manager database or other component.

In some embodiments disclosed herein, the system generates an indication of a state of storage in a plurality of storage operation cells. The indication may include a metric associated with a state of storage, such as a level of data protection or data availability. In some embodiments, the metric may be generated according to values or weights associated with a service level agreement ("SLA").

In some embodiments, the system may calculate data costing information and other information including information associated with the cost of storing data and data availability associated with storage operation cells. The system may identify network elements, associate characteristics or metrics with the network elements, receive additional data, such as SRM or HSM data, from storage operation cells, and correlate the additional data with the network elements to calculate a cost of data or an availability of data. In some embodiments, data may be identified according to user, department, project, or other identifier. In other embodiments, data availability or data cost is compared to an SLA. In some embodiments, a prediction of media usage is generated according to data use, availability, or cost.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 2b is a portion of the illustrative screen of FIG. 2a, constructed in accordance with one embodiment of the present invention.

FIG. 2d is a portion of the trending report shown in FIG. 2c in accordance with one embodiment of the present invention.

FIG. 7 is an illustrative graphical user interface that may be employed to select certain storage parameters.

FIG. 9 depicts a graphical user interface constructed in accordance with one embodiment of the present invention for creating cost categories.

DETAILED DESCRIPTION

Figure 1:
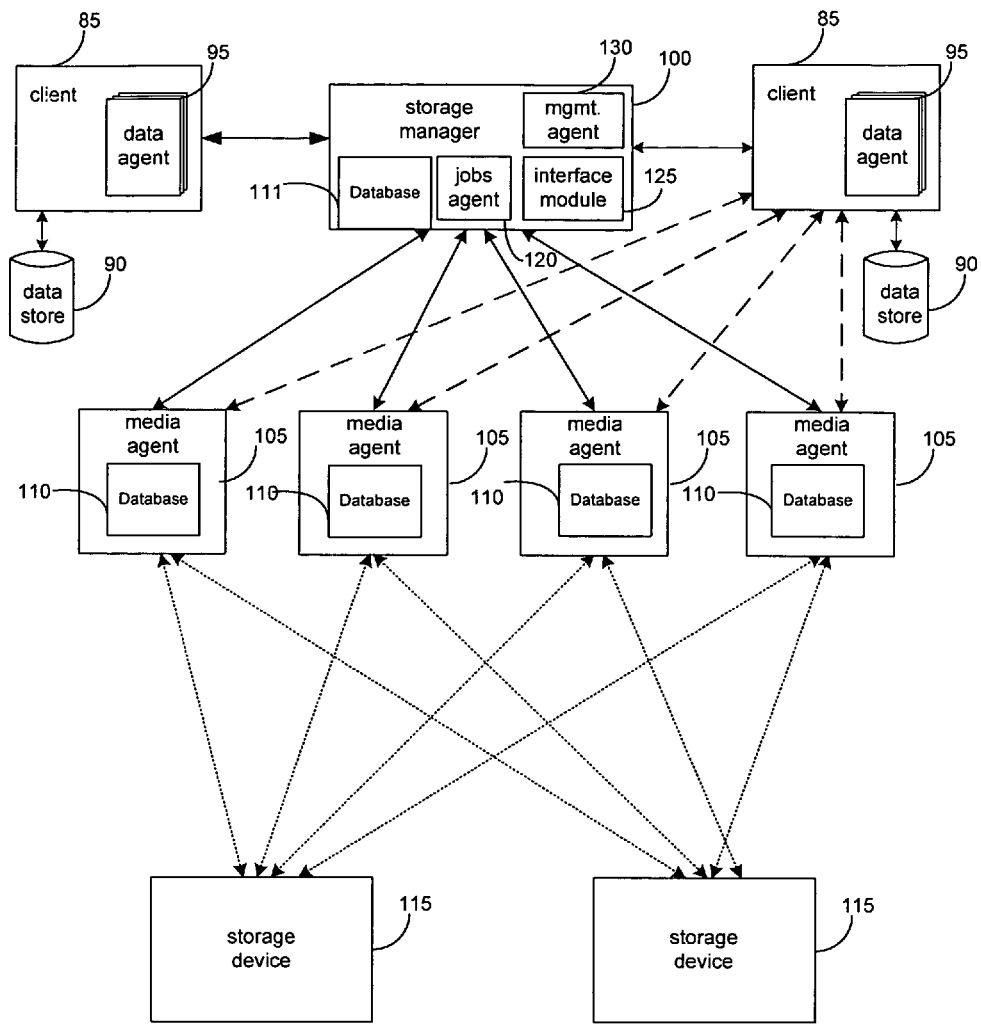
FIG. 1 is a block diagram of a storage operation cell in a system to perform storage operations on electronic data in a computer network according to an embodiment of the invention.

With reference to FIGS. 1 through 10, embodiments and features of the invention are presented. FIG. 1 illustrates a block diagram of a storage operation cell 50 that may perform storage operations on electronic data in a computer network in accordance with an embodiment of the present invention. As shown, storage operation cell 50 may generally include a storage manager 100, a data agent 95, a media agent 105, a storage device 115, and, in some embodiments, may include certain other components such as a client 85, a data or information store 90, databases 110 and 111, jobs agent 120, an interface module 125, and a management agent 130. Such system and elements thereof are exemplary of a modular backup system such as the CommVault QiNetix system, and also the CommVault GALAXY backup system, available from CommVault Systems, Inc. of Oceanport, N.J., and further described in U.S. patent application Ser. No. 09/610,738 which is incorporated herein by reference in its entirety.

A storage operation cell, such as cell 50, may generally include combinations of hardware and software components associated with performing storage operations on electronic data. Exemplary storage operation cells according to embodiments of the invention may include, as further described herein, CommCells as embodied in the QNet storage management system and the QiNetix storage management system by CommVault Systems of Oceanport, N.J. According to some embodiments of the invention, storage operations cell 50 may be related to backup cells and provide some or all of the functionality of backup cells as described in application Ser. No. 09/354,058. However, in certain embodiments, storage operation cells may also perform additional types of storage operations and other types of storage management functions that are not generally offered by backup cells.

In accordance with certain embodiments of the present invention, additional storage operations performed by storage operation cells may include creating, storing, retrieving, and migrating primary data copies and secondary data copies (which may include, for example, snapshot copies, backup copies, HSM copies, archive copies, and other types of copies of electronic data). In some embodiments, storage operation cells may also provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In some embodiments, storage operations may be performed according to a storage policy. A storage policy is generally a data structure or other information source that includes a set of preferences and other storage criteria for performing a storage operation. The preferences and storage criteria may include, but are not limited to, a storage location, relationships between system components, network pathway to utilize, retention policies, data characteristics, compression or encryption requirements, preferred system components to utilize in a storage operation, and other criteria relating to a storage operation. Thus, a storage policy may indicate that certain data is to be stored in a specific storage device, retained for a specified period of time before being aged to another tier of secondary storage, copied to secondary storage using a specified number of streams, etc. A storage policy may be stored to a storage manager database 111, to archive media as metadata for use in restore operations or other storage operations, or to other locations or components of the system.

A schedule policy may specify when to perform storage operations and how often and may also specify performing certain storage operations on sub-clients of data and how to treat those sub-clients. A sub-client may represent static or dynamic associations of portions of data of a volume and are mutually exclusive. Thus, a portion of data may be given a label and the association is stored as a static entity in an index, database or other storage location used by the system. Sub-clients may also be used as an effective administrative scheme of organizing data according to data type, department within the enterprise, storage preferences, etc. For example, an administrator may find it preferable to separate e-mail data from financial data using two different sub-clients having different storage preferences, retention criteria, etc. Storage operation cells may contain not only physical devices, but also may represent logical concepts, organizations, and hierarchies. For example, a first storage operation cell 50 may be configured to perform HSM operations, such as data backup or other types of data migration, and may include a variety of physical components including a storage manager 100 (or management agent 130), a media agent 105, a client component 85, and other components as described herein. A second storage operation cell may contain the same or similar physical components, however, it may be configured to perform SRM operations, such as monitoring a primary data copy or performing other known SRM operations.

Thus, as can be seen from the above, although the first and second storage operation cells are logically distinct entities configured to perform different management functions (i.e., HSM and SRM respectively), each cell may contain the same or similar physical devices in both storage operation cells. Alternatively, in other embodiments, different storage operation cells may contain some of the same physical devices and not others. For example, a storage operation cell 50 configured to perform SRM tasks may contain a media agent 105, client 85, or other network device connected to a primary storage volume, while a storage operation cell 50 configured to perform HSM tasks may instead include a media agent 105, client 85, or other network device connected to a secondary storage volume and not contain the elements or components associated with and including the primary storage volume. These two cells, however, may each include a different storage manager 100 that coordinates storage operations via the same media agents 105 and storage devices 115. This "overlapping" configuration allows storage resources to be accessed by more than one storage manager 100 such that multiple paths exist to each storage device 115 facilitating failover, load balancing and promoting robust data access via alternative routes.

Alternatively, in some embodiments, the same storage manager 100 may control two or more cells 50 (whether or not each storage cell 50 has its own dedicated storage manager 100). Moreover, in certain embodiments, the extent or type of overlap may be user-defined (through a control console (not shown)) or may be automatically configured to optimize data storage and/or retrieval.

Data agent 95 may be a software module or part of a software module that is generally responsible for archiving, migrating, and recovering data from client computer 85 stored in an information store 90 or other memory location. Each client computer 85 may have at least one data agent 95 and the system can support multiple client computers 85. In some embodiments, data agents 95 may be distributed between client 85 and storage manager 100 (and any other intermediate components (not shown)) or may be deployed from a remote location or its functions approximated by a remote process that performs some or all of the functions of data agent 95.

Embodiments of the present invention may employ multiple data agents 95 each of which may backup, migrate, and recover data associated with a different application. For example, different individual data agents 95 may be designed to handle Microsoft Exchange data, Lotus Notes data, Microsoft Windows 2000 file system data, Microsoft Active Directory Objects data, and other types of data known in the art. Other embodiments may employ one or more generic data agents 95 that can handle and process multiple data types rather than using the specialized data agents described above.

If a client computer 85 has two or more types of data, one data agent 95 may be required for each data type to archive, migrate, and restore the client computer 85 data. For example, to backup, migrate, and restore all of the data on a Microsoft Exchange 2000 server, the client computer 85 may use one Microsoft Exchange 2000 Mailbox data agent 95 to backup the Exchange 2000 mailboxes, one Microsoft Exchange 2000 Database data agent 95 to backup the Exchange 2000 databases, one Microsoft Exchange 2000 Public Folder data agent 95 to backup the Exchange 2000 Public Folders, and one Microsoft Windows 2000 File System data agent 95 to backup the client computer's 85 file system. These data agents 95 would be treated as four separate data agents 95 by the system even though they reside on the same client computer 85.

Alternatively, other embodiments may use one or more generic data agents 95, each of which may be capable of handling two or more data types. For example, one generic data agent 95 may be used to back up, migrate and restore Microsoft Exchange 2000 Mailbox data and Microsoft Exchange 2000 Database data while another generic data agent may handle Microsoft Exchange 2000 Public Folder data and Microsoft Windows 2000 File System data, etc.

Generally speaking, storage manager 100 may be a software module or other application that coordinates and controls storage operations performed by storage operation cell 50. Storage manager 100 may communicate with some or all elements of storage operation cell 50 including client computers 85, data agents 95, media agents 105, and storage devices 115, to initiate and manage system backups, migrations, and data recovery.

Storage manager 100 may include a jobs agent 120 that monitors the status of some or all storage operations previously performed, currently being performed, or scheduled to be performed by storage operation cell 50. Jobs agent 120 may be communicatively coupled with an interface agent 125 (typically a software module or application). Interface agent 125 may include information processing and display software, such as a graphical user interface ("GUI"), an application program interface ("API"), or other interactive interface through which users and system processes can retrieve information about the status of storage operations. Through interface 125, users may optionally issue instructions to various storage operation cells 50 regarding performance of the storage operations as described and contemplated by the present invention. For example, a user may modify a schedule concerning the number of pending snapshot copies or other types of copies scheduled as needed to suit particular needs or requirements. As another example, a user may employ the GUI to view the status of pending storage operations in some or all of the storage operation cells in a given network or to monitor the status of certain components in a particular storage operation cell (e.g., the amount of storage capacity left in a particular storage device). As a further example, interface 125 may display the cost metrics associated with a particular type of data storage and may allow a user to determine overall and target cost metrics associated with a particular data type, or certain storage operation cell 50 or other storage operation as predefined or user-defined (discussed in more detail below).

Storage manager 100 may also include a management agent 130 that is typically implemented as a software module or application program. In general, management agent 130 provides an interface that allows various management components 100 in other storage operation cells 50 to communicate with one another. For example, assume a certain network configuration includes multiple cells 50 adjacent to one another or otherwise logically related in a WAN or LAN configuration (not shown). With this arrangement, each cell 50 may be connected to the other through each respective interface module 125. This allows each cell 50 to send and receive certain pertinent information from other cells 50 including status information, routing information, information regarding capacity and utilization, etc. These communication paths may also be used to convey information and instructions regarding storage operations.

For example, a management agent 130 in first storage operation cell 50 may communicate with a management agent 130 in a second storage operation cell 50 regarding the status of storage operations in the second storage operation cell. Another illustrative example includes the case where a management agent 130 in first storage operation cell 50 communicates with a management agent 130 in a second storage operation cell to control the storage manager 100 (and other components) of the second storage operation cell via the management agent 130 contained in the storage manager 100.

Another illustrative example is the case where management agent 130 in the first storage operation cell 50 communicates directly with and controls the components in the second storage management cell 50 and bypasses the storage manager 100 in the second storage management cell. If desired, storage operation cells 50 can also be organized hierarchically such that hierarchically superior cells control or pass information to hierarchically subordinate cells or vice versa.

Storage manager 100 may also maintain an index cache, a database, or other data structure 111. The data stored in database 111 may be used to indicate logical associations between components of the system, user preferences, management tasks, some SRM or HSM data or other useful data. As further described herein, some of this information may be stored in a media agent database or other local data store according to some embodiments. For example, the storage manager 100 may use data from database 111 to track logical associations between media agents 105 and storage devices 115.

Generally speaking, a media agent 105 may be implemented as software module that conveys data, as directed by a storage manager 100, between a client computer 85 and one or more storage devices 115 such as a tape library, a magnetic media storage device, an optical media storage device, or any other suitable storage device. In one embodiment, media agents 105 may be communicatively coupled with and control a storage device 115 associated with that particular media agent. A media agent 105 may be considered to be associated with a particular storage device 115 if that media agent 105 is capable of routing and storing data to particular storage device 115.

In operation, a media agent 105 associated with a particular storage device 115 may instruct the storage device to use a robotic arm or other retrieval means to load or eject a certain storage media, and to subsequently archive, migrate, or restore data to or from that media. Media agents 105 may communicate with a storage device 115 via a suitable communications path such as a SCSI or fiber channel communications link. In some embodiments, the storage device 115 may be communicatively coupled to a data agent 105 via a Storage Area Network ("SAN").

Each media agent 105 may maintain a index cache, a database, or other data structure 110 which stores index data generated during backup, migration, and restore and other storage operations as described herein. For example, performing storage operations on Microsoft Exchange data may generate index data. Such index data provides a media agent 105 or other external device with a fast and efficient mechanism for locating data stored or backed up. Thus, in some embodiments, a storage manger database 111 may store data associating a client 85 with a particular media agent 105 or storage device 115, for example, as specified in a storage policy, while media agent database 110 may indicate where specifically the client 85 data is stored in storage device 115, what specific files were stored, and other information associated with storage of client 85 data. In some embodiments, such index data may be stored along with the data backed up in a storage device 115, with an additional copy of the index data written to index cache 110. The data in index cache 110 is thus readily available for use in storage operations and other activities without having to be first retrieved from the storage device 115.

In some embodiments, certain components may reside and execute on the same computer. For example, in some embodiments, a client computer 85 such as a data agent 95, a media agent 105, or a storage manager 100 coordinates and directs local archiving, migration, and retrieval application functions as further described in U.S. patent application Ser. No. 09/610,738. This client computer 85 can function independently or together with other similar client computers 85.

Figure 2:
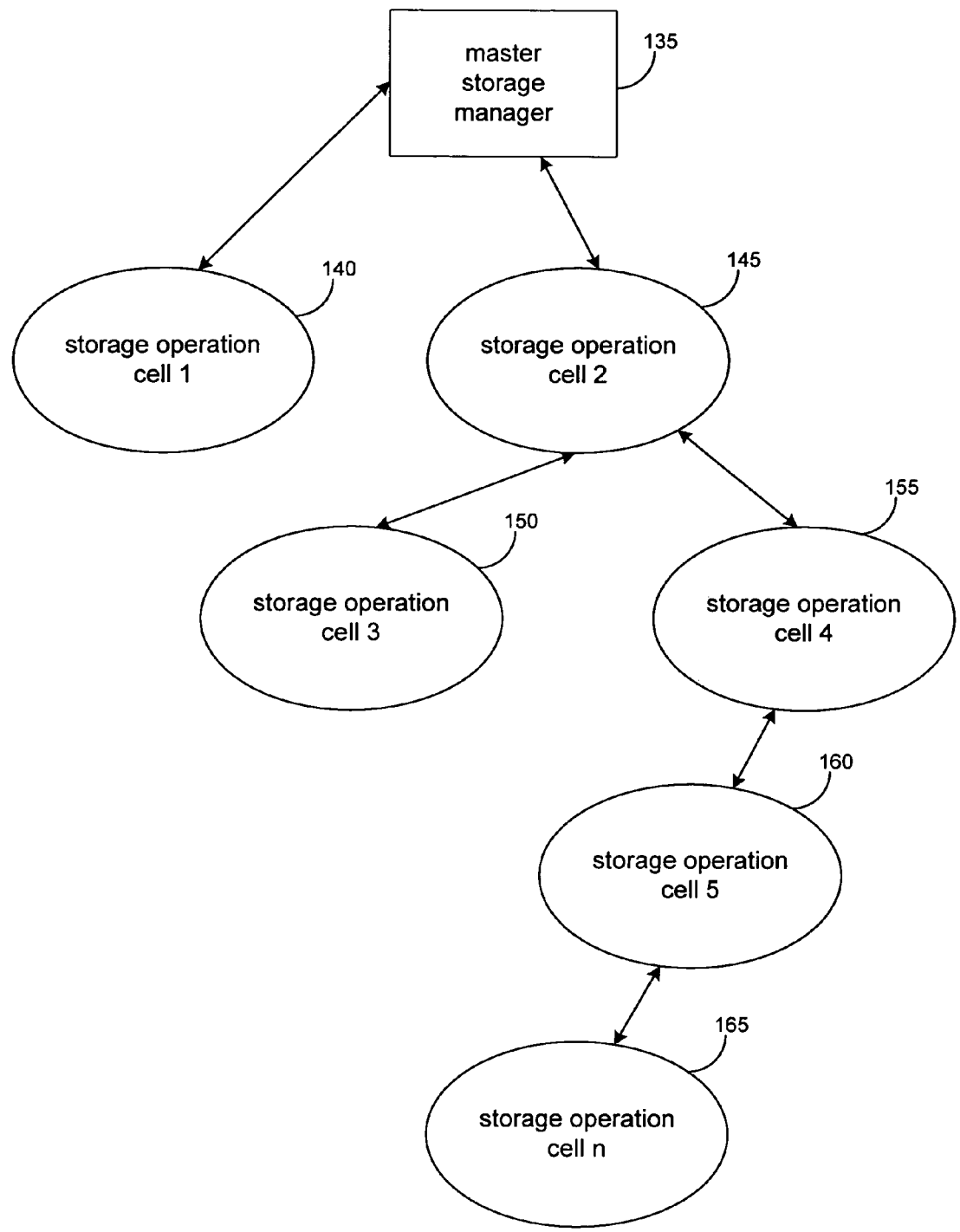
FIG. 2 is a block diagram of a hierarchically organized group of storage operation cells in a system to perform storage operations on electronic data in a computer network according to an embodiment of the invention.

FIG. 2 presents a generalized block diagram of a hierarchically organized group of storage operation cells in a system to perform storage operations on electronic data in a computer network in accordance with an embodiment of the present invention. It will be understood that although the storage operation cells generally depicted in FIG. 2 have different reference numbers than the cell 50 shown in FIG. 1, these cells may be configured the same as or similar to the storage cell 50 depicted in FIG. 1.

As shown, the system illustrated in FIG. 2 may include a master storage manager component 135 and various other storage operations cells. As shown, the illustrative embodiment in FIG. 2 includes a first storage operation cell 140, a second storage operation cell 145, a third storage operation cell 150, a fourth storage operation cell 155, a fifth storage operation cell 160, and an nth storage operation cell 165. However, it will be understood this illustration is only exemplary and that fewer or more storage operation cells may be present or interconnected differently if desired.

Storage operation cells, such as the ones shown in FIG. 2 may be communicatively coupled and hierarchically organized. For example, a master storage manager 135 may be associated with, communicate with, and direct storage operations for a first storage operation cell 140, a second storage operation cell 145, a third storage operation cell 150, a fourth storage operation cell 155, a fifth storage operation cell 160, and an nth storage operation cell 165. In some embodiments, the master storage manager 135 may not be part of any particular storage operation cell. In other embodiments (not shown), master storage manager 135 may itself be part of a certain storage operation cell.

Thus, in operation, master storage manager 135 may communicate with a management agent of the storage manager of the first storage operation cell 140 (or directly with the other components of first cell 140) with respect to storage operations performed in the first storage operation cell 140. For example, in some embodiments, master storage manager 135 may instruct the first storage operation cell 140 with certain commands regarding a desired storage operation such as how and when to perform particular storage operations including the type of operation and the data on which to perform the operation.

In other embodiments, master storage manager 135 may track the status of its associated storage operation cells, such as the status of jobs, system components, system resources, and other items, by communicating with manager agents (or other components) in the respective storage operation cells. Moreover, master storage manager 135 may track the status of its associated storage operation cells by receiving periodic status updates from the manager agents (or other components) in the respective cells regarding jobs, system components, system resources, and other items. For example, master storage manager 135 may use methods to monitor network resources such as mapping network pathways and topologies to, among other things, physically monitor storage operations and suggest, for example, alternate routes for storing data as further described herein.

In some embodiments, master storage manager 135 may store status information and other information regarding its associated storage operation cells and other system information in an index cache, database or other data structure accessible to manager 135. A presentation interface included in certain embodiments of master storage manager 135 may access this information and present it to users and system processes with information regarding the status of storage operations, storage operation cells, system components, and other information of the system.

As mentioned above, storage operation cells may be organized hierarchically. With this configuration, storage operation cells may inherit properties from hierarchically superior storage operation cells or be controlled by other storage operation cells in the hierarchy (automatically or otherwise). Thus, in the embodiment shown in FIG. 2, storage operation cell 145 may control or is otherwise hierarchically superior to storage operation cells 150, 155, 160 and 165. Similarly, storage operation cell 155 may control storage operation cells 160 and 165. Alternatively, in some embodiments, storage operation cells may inherit or otherwise be associated with storage policies, storage preferences, storage metrics, or other properties or characteristics according to their relative position in a hierarchy of storage operation cells.

Storage operation cells may also be organized hierarchically according to function, geography, architectural considerations, or other factors useful or desirable in performing storage operations. For example, in one embodiment, storage operation cell 140 may be directed to create snapshot copies of primary copy data, storage operation cell 145 may be directed to create backup copies of primary copy data or other data. Storage operation cell 140 may represent a geographic segment of an enterprise, such as a Chicago office, and storage operation cell 145 may represents a different geographic segment, such as a New York office. In this example, the second storage operation cells 145, 150, 155, 160, and 165 may represent departments within the New York office. Alternatively, these storage operation cells could be further divided by function performing various types of copies for the New York office or load balancing storage operations for the New York office.

As another example, and as previously described herein, different storage operation cells directed to different functions may also contain the same or a subset of the same set of physical devices. Thus, one storage operation cell in accordance with the principles of the present invention may be configured to perform SRM operations (such as a QSM cell in the CommVault QiNetix system) and may contain the same, similar or a subset of the same physical devices as a cell configured to perform HSM or other types of storage operations. Each storage operation cell may, however, share the same parent or, alternatively, may be located on different branches of a storage operation cell hierarchy tree. For example, storage operation cell 140 may be directed to SRM operations whereas storage operation cell 155 may be directed to HSM operations. Similarly, storage operation cell 150 may be configured to perform SRM operations and storage operation cell 155 may be configured to perform HSM operations. Those skilled in the art will recognize that a wide variety of such combinations and arrangements of storage operation cells are possible to address a broad range of different aspects of performing storage operations in a hierarchy of storage operation cells.

In some embodiments, hierarchical organization of storage operation cells facilitates, among other things, system security and other considerations. For example, in some embodiments, only authorized users may be allowed to access or control certain storage operation cells. For example, a network administrator for an enterprise may have access to many or all storage operation cells including master storage manager 135. But a network administrator for only the New York office, according to a previous example, may only have access to storage operation cells 145-165, which form the New York office storage management system.

The hierarchical organization of storage operation cells may facilitate storage management planning and decision-making. For example, in some embodiments, data and other information related to HSM storage operation cells and SRM storage operation cells may be normalized (e.g., converted into a common format with normalized identifiers and other information) and combined by a master storage manager component or other hierarchically superior (or, if desired, hierarchically subordinate) component, and a user of master storage manager 135 may view the status of some or all jobs in associated storage operation cells as well as the status of each component of the storage operation cells present in the system. Users may then plan and make decisions based on this global data. For example, a user may view high-level information regarding storage operations for the entire system, such as job status, component status, resource status (such as network pathways, etc.), and other information. This may be done from an SRM perspective to view primary copy information or from an HSM perspective to view secondary copy information. A user may also drill down through menus or use other means to obtain more detailed information regarding a particular storage operation cell or group of storage operation cells.

In other embodiments master storage manager 135 may alert a user such as a system administrator when a particular resource is unavailable or congested. For example, a particular storage device might be full or require additional media. For example, a master storage manager may use information from an HSM storage operation cell and an SRM storage operation cell to present indicia or otherwise alert a user or otherwise identify aspects of storage associated with the storage management system and hierarchy of storage operation cells.

Alternatively, a storage manager in a particular storage operation cell may be unavailable due to hardware failure, software problems, or other reasons. In some embodiments, master storage manager 135 (or another storage manager within the hierarchy of storage operation cells) may utilize the global data regarding its associated storage operation cells to suggest solutions to such problems when they occur (or act as a warning prior to occurrence). For example, master storage manager 135 may alert the user that a storage device in a particular storage operation cell is full or otherwise congested, and then suggest, based on job and data storage information contained in its database, an alternate storage device. Other types of corrective actions based an such information may include suggesting an alternate data path to a particular storage device, or dividing data to be stored among various available storage devices as a load balancing measure or to otherwise optimize storage or retrieval time. In some embodiments, such suggestions or corrective actions may be performed automatically, if desired.

In operation, some of the types of information that may be monitored by the HSM component for an application such as Microsoft Exchange may include:
File Systems and File Analysis
    Distribution by file types
    Distribution by file sizes
    Distribution by modification time/access time
    Distribution by owner, etc.
    Capacity and Asset Reporting
    By host
    By disk
    By partitions
    Availability Reporting
    Disks
    Hosts
    Applications
Message Level
    Distribution across mailboxes
    By Message attachment type
    By Message age
    Data Migration report
    Usage Reporting
    By Storage Group
    By Store
    By Mailbox, etc.

In alternate embodiments, HSM and SRM components may be aware of each other due to a common database or metabase of information which may include normalized data. Therefore, in those embodiments there is no need for such information to pass through a master storage manager as these components may be able to communicate directly with one another. For example, storage operation cell 150 may communicate directly with storage operation cell 165 and vice versa. This may be accomplished through a direct communications link between the two or by passing data through intermediate cells, such as cells 145-160 in this case.

Figure 2A:
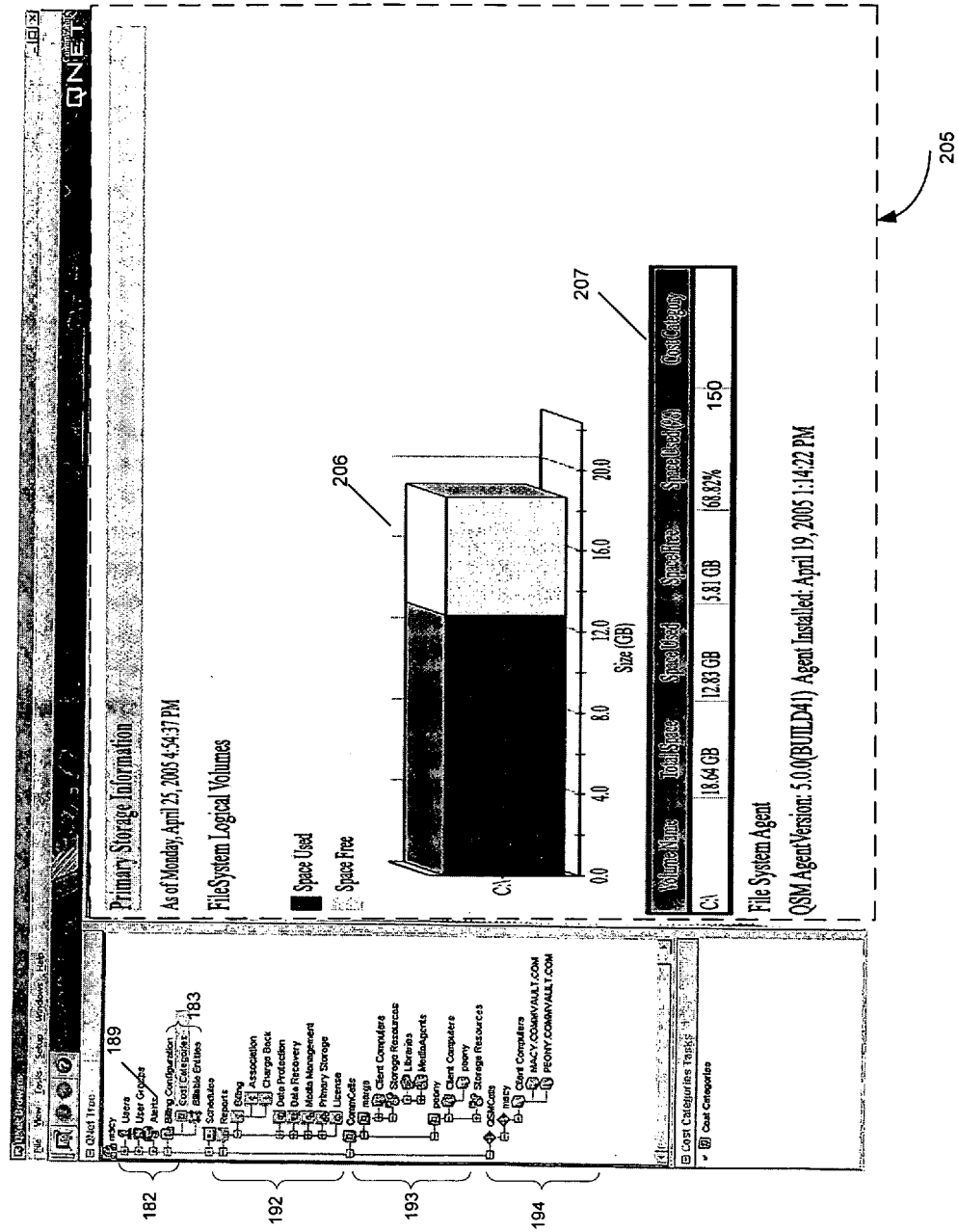
FIG. 2a is an illustrative interface screen showing a unified view of HSM and SRM data constructed in accordance with one embodiment of the present invention.

FIGS. 2a and 2b present an exemplary management console 208 suitable for use with the present invention. As shown, management console 208 provides a "unified view" such that a user may observe and manage the status of both HSM and SRM data operations. Management console 208 links SRM data concerning front line primary storage with HSM jobs or operations and provides a user with an indication of how data may be migrated or is scheduled to be migrated within the storage system. As shown, controller 208 may include a primary storage section 205 and a secondary storage section 210. Console 208 may be provided either locally or remotely (e.g., over the Internet) to allow users to monitor and control storage operations from virtually any location.

As shown, section 205 provides information concerning primary storage (e.g., SRM) metrics. For example, section 205 includes a bar graph 206 illustrating the amount of free and used space in a selected primary volume. This information is also presented numerically in metric chart 207 which may include the volume name, total space of the volume, space used, free space, job scheduling, billable entity, data protection levels, job scheduling, cost category, and types of storage operations performed or scheduled.

Section 210 of FIG. 2b, which may represent the bottom portion of the unified screen (with section 205 on top) provides information concerning secondary storage (e.g., HSM). Section 210 may include charts 184 and 212 that provide sub-client and related information. For example chart 184, may present, instance, and sub-client information along with associated scheduling, storage policy information and indicate whether certain data protection operation have occurred, Chart 212 may provide the last data protection type and the billable entity associated the instance or sub-client.

Moreover, as shown on the right hand side of FIG. 2A, the unified console may include a directory tree that allows a user to drill down to various parts of the system. For example, the user may examine a particular one of various user groups by selecting one of the users or user groups specified in field 182. A user may view alerts by selecting field 189 or billing or other cost categories by selecting from field 183. Certain system reports or schedules may be generated by making the appropriate selection in field 190, and information associated with specific storage cells and other systems specific modules may be viewed by selecting from among the options in field 193 and 194.

One advantage of using such integrated management console is that it allows network administrators to monitor data management activities and developments on a single integrated display without switching between multiple consoles or learning different interfaces. Another benefit is it reduces the expense associated with training administrators on multiple products and the problems associated with attempting to administrate systems that are independent of one another. The information on which this console based may be located in a shared database (e.g., a master storage manager index) that stores common normalized information (to prevent the confusing duplication of data). However, it will be understood that in certain embodiments, the HSM and SRN screens may be separate or distributed, if desired, Event viewer 205 may be configured to allow a user monitor some or all SRM and HSM events within the storage system. Event viewer 205 may be configured to display operations based in time, type of event or other criteria (e.g., most recent first. etc.). In some embodiments, a user may set certain user preferences to display such as the severity levels and number of events to view. Event viewer 205 may also support search queries, allowing a user to view events by time period, severity or Job ID. Such information may be displayed in multiple windows focused on specific clients, events or software modules can be opened and monitored simultaneously. Thus, event viewer 205 provides a customizable tool to allow the administrator to effectively and efficiently monitor and manage the jobs.

In some embodiments, unified console 208 may support a reporting capability that allows the generation of a variety of reports, which may be tailored to a particular aspect of data management. Report types may include: scheduling, event management, media management and data aging. Available reports may also include backup history, data aging history, auxiliary copy history, job history, library and drive, media in library, restore history and storage policy. Such reports may be specified and created at a certain point in time as a network analysis, forecasting, or provisioning tool. Integrated reports may also be generated that illustrate SRM and HSM information, storage and performance metrics, risks and storage costing information. Moreover, in certain embodiments, users may create their own reports based on specific needs.

Furthermore, in some embodiments, master storage manager 135 (or other network storage manager) may contain programming or other logic directed toward analyzing the storage patterns and resources of its associated storage operation cells and may suggests optimal or alternate locations or methods of performing storage operations. Thus, for example, storage manager 135 may monitor or otherwise keep track of the amount of resources available such as storage media in particular cell group of cells 50. This allows storage manager 135 to note when the level of available storage media (such as magnetic or optical media) falls below (and/or above) a particular level, so additional storage media be added or removed as need to maintain a desired level of service. This information may be retained and examined over a time period of interest and used as a forecasting tool (e.g., for predicting future media usage, future media usage growth, trending analysis, system provisioning information, etc.). Such information may be presented to the user in the form of a report (discussed in more detail below).

Master storage manager 135 also may analyze traffic patterns and suggest or automatically route data via a particular route to e.g., to certain facilitate storage and minimize congestion. For example, based on prior traffic information, master storage manager 135 may suggest that backup data be sent via a different network segment or to a different storage operation cell or storage device to prevent resource congestion and avoid delays in access time. In some embodiments, users can direct specific queries to master storage manager 135 to obtain predictions relating to storage operations or storage operation information. Such information may be presented to the user in the form of a report (discussed in more detail below).

In some embodiments, the predictions described above may be based on a trending analysis that may be used to predict various network operations or use of network resources such as network traffic levels, storage media use, use of bandwidth of communication links, use of media agent components, etc. The trending analysis may employ any suitable forecasting algorithm useful in predicting future network operations or resource use as described above (typically based on past performance). One example of such an algorithm may include calculating a moving average of a certain network operation or resource that takes into consideration specific information of a time period of interest. Some of the steps involved in such a calculation may include: 1) calculating a general moving average, 2) calculating a seasonal index, 3) calculating the average index for each day, 4) performing a linear interpolation on the moving average to obtain a linear formula according to the following equation:

$$m = \frac{NE * \sum xy - \sum x \sum y}{NE * \sum x^2 - (\sum x)^2} \quad (1)$$

and 5) calculating the value forecast by multiplying the moving average and seasonal average index. However, any other suitable formula or method may be used if desired.

Figure 2C:
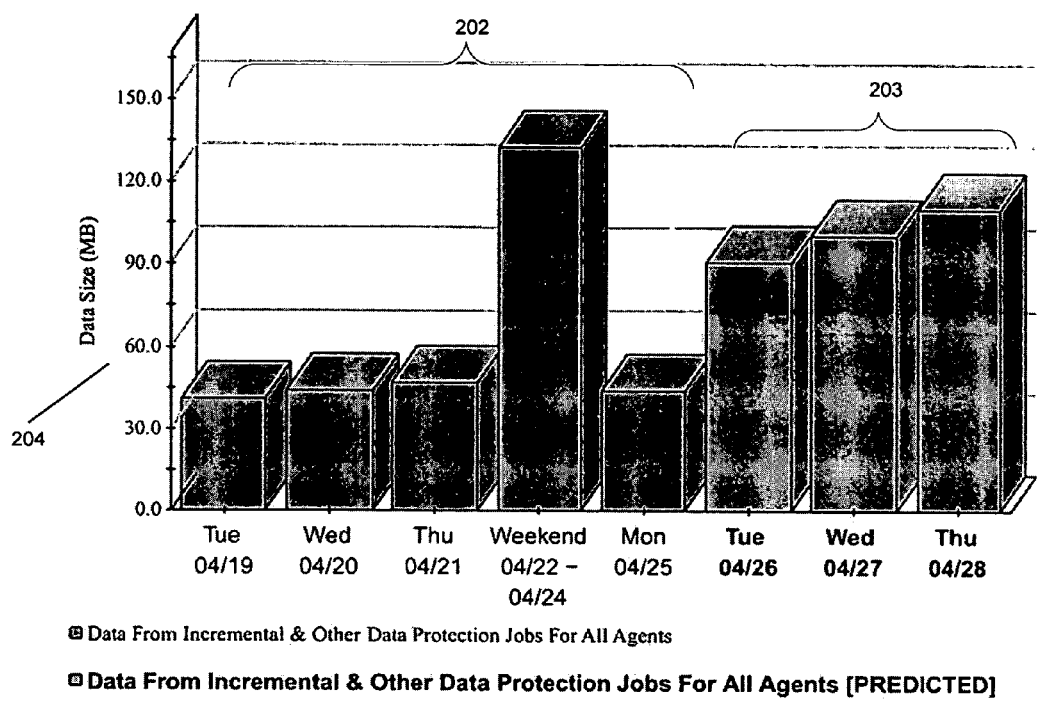
FIG. 2c depicts and illustrative trending report constructed in accordance with one embodiment of the present invention.

In some embodiments, such trending or forecast information may be presented to the user in the form of a report. For example, FIG. 2c illustrates a trending report for the expected performance of data protection operations. As shown, bar graph 201 may be generated that includes data representing past data protection operations 202 (for dates April 19-April 25) and data representing the projected data protection operations 203 (dates April 26-April 28) and the amount of data subject to a protection operation (204). The projections may be generated based on the techniques described above. Also shown is chart in FIG. 2d which may display specific daily or other time-based information about the data protection operations, such as agent type (field 216) and the amount of data backed up or projected to be backed up (fields 217 and 218 respectively) during particular periods.

Users may create reports based on certain information available within the system. The may be accomplished, for example, using a report console that may allow the user to specify the parameters or information to be used in creating the report. Alternatively, in some embodiments, reports may be predefined and a user may select a report from a list of reports in a pull down menu or other list (not shown).

Figure 2E:
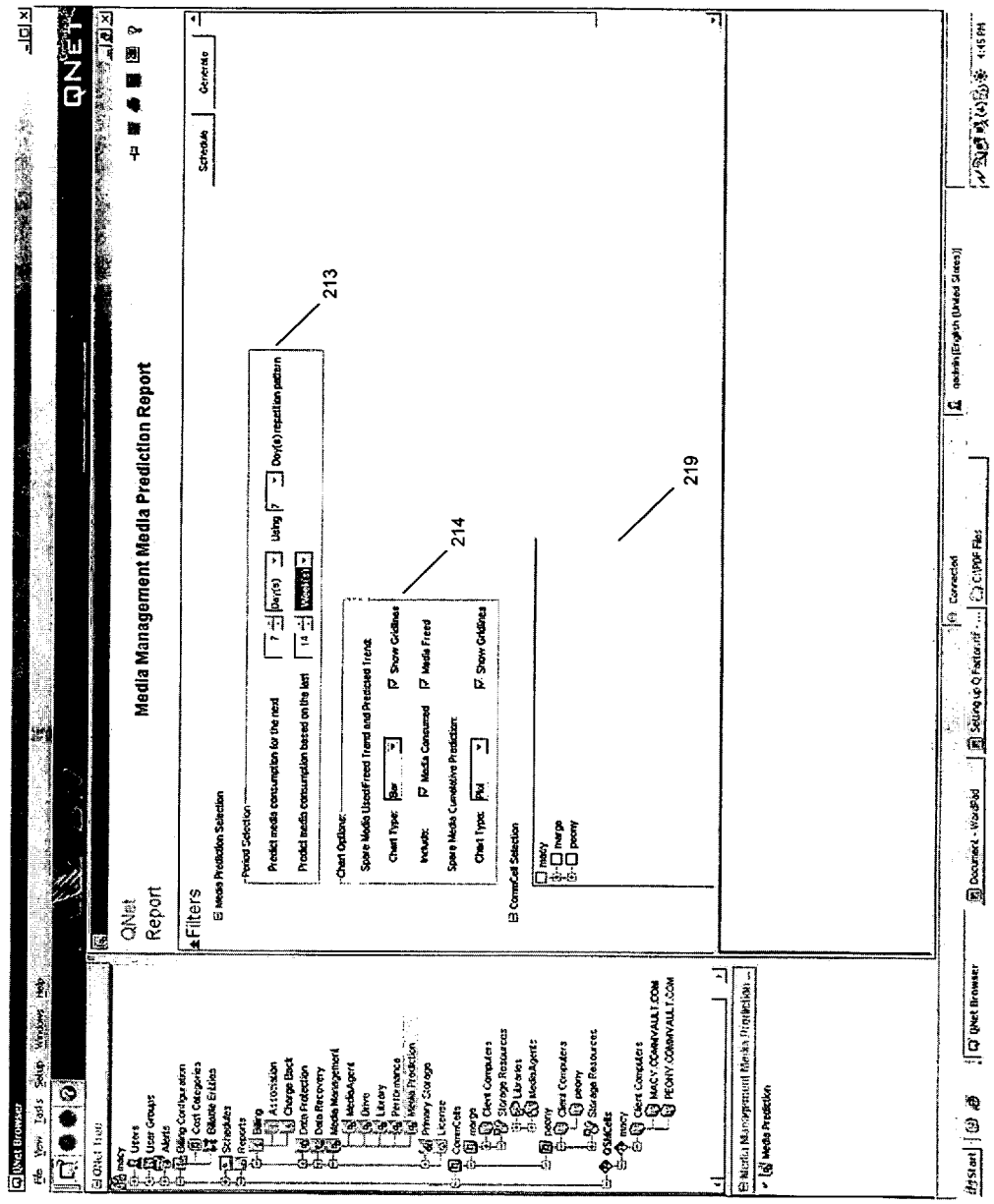
FIG. 2e depicts a graphical user interface suitable for creating trending and other reports in accordance with one embodiment of the present invention.

FIG. 2e illustrates a console that may be used to generate a report. The particular console displayed generates a media prediction report, however, any other suitable report may be generated if desired. As shown, FIG. 2E includes period selection field 213, chart options field 214 and storage cell selection field 219. In operation, a user may specify through field 213 the time period of the prediction (i.e., how far in time the prediction will cover) and the past data on which to base the prediction. The user may also specify certain chart options through field 214 such as a cumulative or trend prediction, the chart type, media to include (e.g., consumed or used). Also a user may specify through consoles 219 which storage cells or groups of storage cells to include in the prediction. Those skilled in the art will recognize this may be applied to other system resources such as HSM/SRM usage, network traffic, primary volume growth, SLA levels, failure rates, hardware usage, etc.

Certain embodiments of the present invention may employ auto-discovery techniques that may provide a list of available storage devices and locations which may be made available (automatically or otherwise) to the administrator for use in establishing a storage policy. By providing a comprehensive list of possible targets for backup copies (e.g., disk, tape and optical), an administrator has an accurate view of the environment which facilitates the creation of a corresponding data protection scheme utilizing available resources. One advantage of this is it tends to reduce the possibility of overlooking possible storage devices or inadvertently misconfiguring the device. By employing auto-discovery techniques, such information may discovered and stored such that the policies associated with a discovered device contain any necessary connection or other configuration information.

Figure 3:
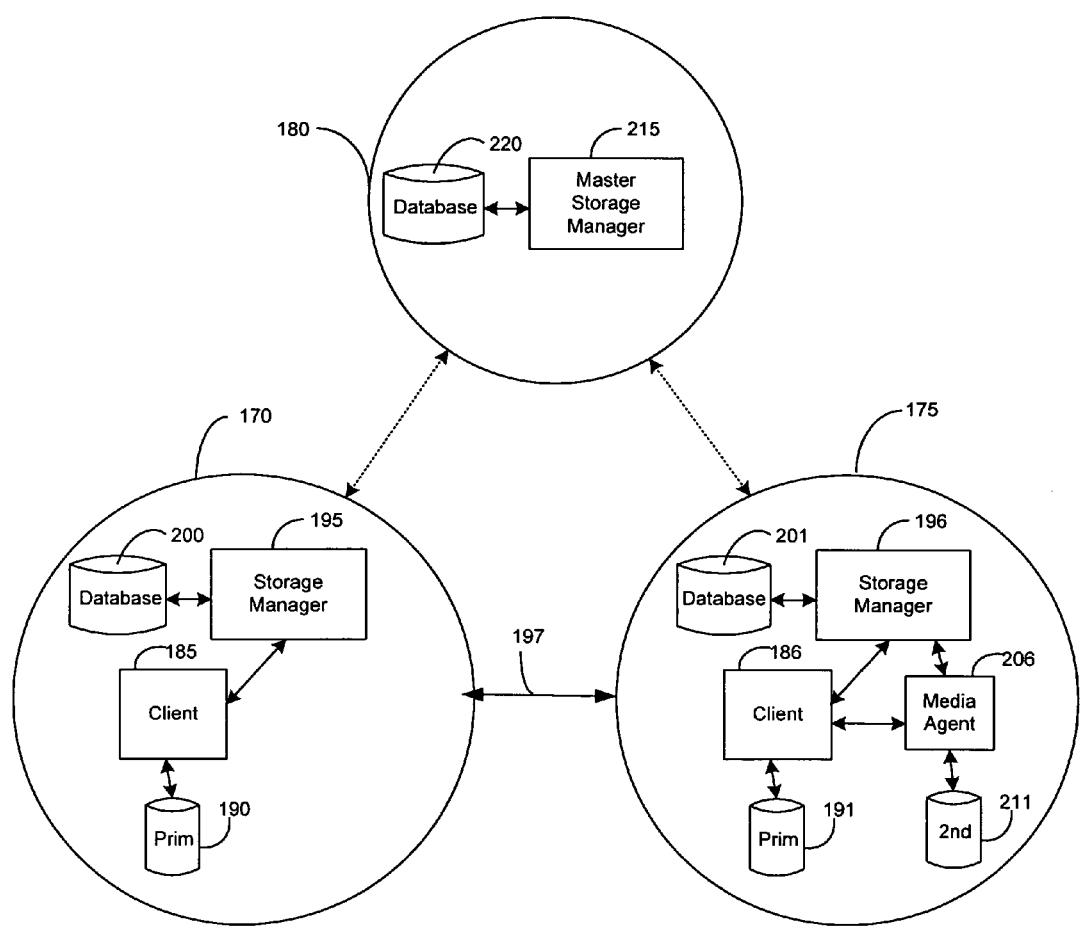
FIG. 3 is a block diagram of a hierarchically organized group of storage operation cells in a system to perform SRM and HSM storage operations on electronic data in a computer network according to an embodiment of the invention.

FIG. 3 illustrates a block diagram of a hierarchically organized group of storage operation cells in a system to perform SRM and HSM storage operations on electronic data in a computer network in accordance with the principles of the present invention. As shown, FIG. 3 includes a first storage operation cell 170, a second storage operation cell 175, a third storage operation cell 180, a client 185 in communication with a primary volume 190 storing data, a storage manager component 195 in communication with a storage manager database 200, a media agent 206 in communication with a secondary storage volume 211, and a master storage manager component 215 in communication with a master storage manager database 220.

The first storage operation cell 170 may be configured to perform a particular type storage operation, such as SRM storage operations. For example, the first storage operation cell 170 may monitor and perform SRM-related calculations and operations associated with primary copy data. Thus, the first storage operation cell 170 includes a client component 185 in communication with a primary volume 190 for storing data. For example, client 185 may be directed to using Exchange data, SQL data, Oracle data, or other types of production data used in business applications or other applications and stored in primary volume 190. Storage manager component 195 may contain SRM modules or other logic directed to monitoring or otherwise interacting with attributes, characteristics, metrics, and other information associated with the data stored in primary volume 190. Storage manager 195 may track and store this and other information in storage manager database 200 which may include index information. For example, in some embodiments, storage manager component 195 may track or monitor the amount of available space and other similar characteristics of data associated with primary volume 190. In some embodiments, as further described herein, storage manager component 195 may also issue alerts or take other actions when the information associated with primary volume 190 satisfies certain criteria, such as alert criteria. In some embodiments, this may also include other storage managers, media agents and databases.

Second storage operation cell 175 is directed to another type storage operation, such as HSM storage operations. For example, the second storage operation cell 175 may perform backups, migrations, snapshots, or other types of HSM-related operations known in the art. For example, in some embodiments, data is migrated from faster and more expensive storage such as magnetic storage (i.e., primary storage) to less expensive storage such as tape storage (i.e., secondary storage).

Thus, the second storage operation cell 175 includes client component 186 in communication with the primary volume 191 storing data. In some embodiments, client component 186 and primary volume 191 are the same physical devices as the client component 185 and primary volume 190 in the first storage operation cell 170. Similarly, in some embodiments, the storage manager component 196 and database 201 (which may include index information) in the second storage operation cell 175 are the same physical devices as the storage manager component and index in the first storage operation cell 170. Storage manager component 196, however, typically also contains HSM modules or other logic associated with the second storage operation cell 175 directed to performing HSM storage operations on primary volume 191 data.

Storage operation cell 175 therefore may also contain media agent 206 and a secondary storage volume 211 configured to performing HSM-related operations on primary copy data. For example, storage manager 196 may migrate primary copy data from primary volume 191 to secondary volume 211 using media agent 206. Storage manager 196 may also track and stores information associated with primary copy migration and other similar HSM-related operations in storage manager database 201. For example, in some embodiments, storage manager component 196 may direct HSM storage operations on primary copy data according to according to a storage policy associated with the primary copy 191 and stored in the index 201. In some embodiments, storage manager 196 may also track where primary copy information is stored, for example in secondary storage 211.

Storage operation cell 180 may include a master storage manager 215 and a master storage manager 220. In some embodiments (not shown), additional storage operation cells may be located hierarchically in between storage operation cell 180 and storage operation cells 170 and 175. In some embodiments, additional storage operation cells hierarchically superior to operation cell 180 may also be present in the hierarchy of storage operation cells.

In some embodiments, storage operation cells 170 and 175 may be connected by communications link 197, which may be any suitable communications link such as a fiber channel or SCSI connection that allows cells 170 and 175 to communicate directly with one another (i.e., without necessarily directly or indirectly involving storage cell 180). This may be accomplished, for example, by storage manager 195 communicating with storage manager 196 via link 197. This allows cells 170 and 175 to share information such status or operational characteristics to one another such as availability on primary or secondary storage, trigger events based on such information, etc. This allows for the direct transfer of stored data to from and from the cells (via link 197) without the need to communicate with or pass data through master storage manager 215.

Storage operation cell 180 is also generally directed to performing a type of storage operation, such as integration of SRM and HSM data from other storage operation cells, such as storage operation cells 170 and 175. In some embodiments, the third storage operation cell 180 also performs other types of storage operations and might also be directed to HSM, SRM, or other types of storage operations.

Figure 4:
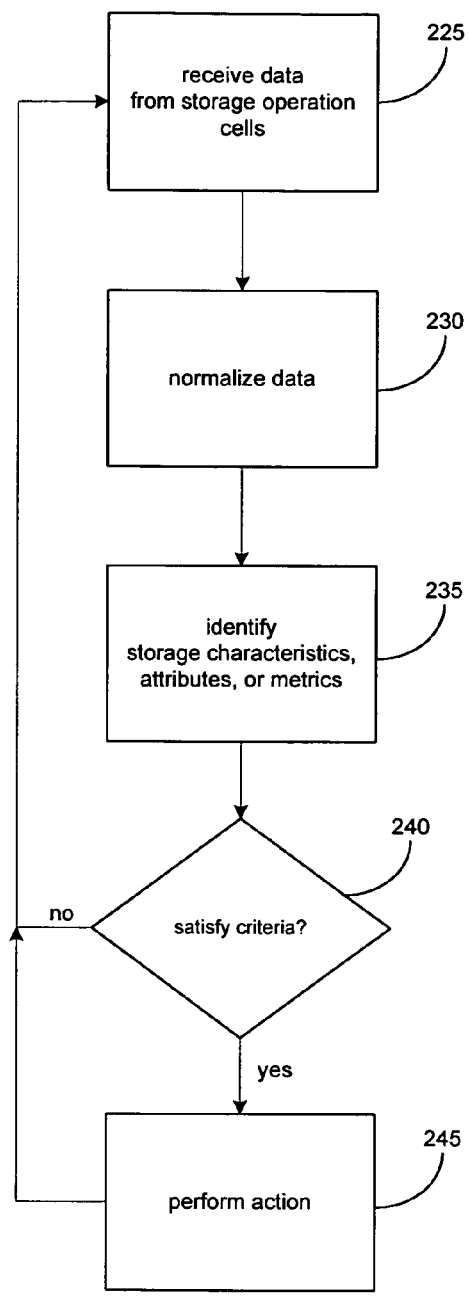
FIG. 4 is a flow diagram of a method to integrate data from storage operation cells according to an embodiment of the invention.

Turning to FIG. 4, a flow diagram of a method to integrate data from storage operation cells according to one embodiment of the invention is presented. For example, the method of FIG. 4 can be applied to integrating SRM data from storage operation cell 170 and HSM data from storage operation cell 175.

The system receives data from storage operation cells, step 225. In some embodiments, however, hierarchically equivalent or subordinate cells may also receive data from other cells. Generally speaking, however, a hierarchically superior cell, such as storage operation cell 180, receives data from hierarchically subordinate cells, such as cells 170 and 175. For example, storage manager 215 may receive SRM data from storage manager 195 in storage operation cell 170 and HSM data from the storage manager 196 in storage operation cell 175. Storage manager 215 may receive, from storage operation cell 170, information about available space on primary volume 190 and receive, from storage operation cell 175, information that client 185 data has been migrated to secondary storage 210. In some embodiments, data may be received from multiple storage operations cells.

One problem traditionally associated with data integrations, such as SRM and HSM data integration, is host identification. For example, various clients or hosts throughout an enterprise often have the same name or network identifier. A client at a site in Maine may have the same name or network identifier as a client in New York. With respect to integrating data from these two clients, prior art systems were thus unable to reliably distinguish between the client in Maine and the client in New York. Similarly, SRM data related to a particular client is not correlated to HSM data related to the same client in prior art systems. HSM systems are distinct from SRM systems and prior art systems were not able to determine whether, for example, a Host A identified by SRM information in a network, was the same Host A identified by HSM information in the network. A similar problem exists, for example, when SRM systems identify a client as Host A and HSM systems identify a client as Host B, however, Host A and Host B are actually the same physical machine or device. The present system overcomes these limitations and addresses this problem by, among other methods, normalizing data received, step 230.

Clients, hosts, network devices, or other types of network elements may be assigned a unique network identifier or other identifier or characteristic that identifies and distinguishes between separate entities. In some embodiments, the network identifier may be generated when a component is associated with the network, for example via auto-detection and assignment routines performed by a storage manager or other component. In other embodiments, identifiers are assigned manually. In yet other embodiments, identifiers may be generated according to characteristics of the network device or element, for example based on a processor serial number, IP or other network address, memory configuration, hardware configuration, or other similar distinguishing characteristics and information. Such identifiers may also be derived by employing hashing routines or by being based on other indicia such as hardware configuration or time of creation. In some embodiments, such identifiers may include Globally Unique Identifiers (GUIDs) generated by an operating system or other application program.

Identifiers associated with network elements may be tracked or monitored by storage managers in storage manager databases. Thus, for example, when HSM modules or other logic in storage operation cell 175 obtain information about client 186, this information may be associated with the identifier for client 186 in addition to whatever name client 186 may have within the HSM system. For example, client 186 may be known by the HSM modules as Host B. Similarly, when SRM modules or other logic in storage operation cell 170 obtain information about client 185 in storage operation cell 170, this information may also be associated with the identifier for client 185 in addition to whatever name client 185 may have in the SRM system. For example, client 185 may be known by the SRM modules as Host A.

When the SRM data and the HSM data is propagated to and received by master storage manager 215, the SRM data and HSM data pertaining to particular network elements may be transmitted with the associated network identifiers of those network elements. Thus, for example, storage manager 215 may normalize data related to Host A and Host B by using the network identifiers and other metadata received with the SRM and HSM information to determine if Host A and Host B are actually both the same physical machine, client 185. Similarly, the primary copy associated with Host A and the primary copy associated with Host B may be identified as the same (or different) primary copy on the same physical media, primary volume 190 using the network identifier (e.g., a GUID).

At this point, storage characteristics, attributes, metrics, and other factors associated with the data received may be identified (step 235). For example, master storage manager 215 may compare SRM or HSM data against certain metrics stored in master storage manager database 220. SRM data related to the total amount of disk space remaining in primary volume 190 thus may be evaluated against a threshold or other criteria. For example, a service level agreement ("SLA") may require that primary volume 190 satisfy a threshold of having 20% available free space to guard against failure due to lack of storage capacity. HSM data related to secondary storage may also be evaluated against a threshold or other criteria. For example, an SLA or an administrator preference may require that data older than a given time period be migrated from secondary storage volume 211 to other storage or from primary volume 191 to secondary storage volume 211. Alternatively, storage characteristics related to a particular volume or network element across the enterprise or a plurality of storage operation cells may be evaluated.

Thus, at this point, the system may determine whether the data received satisfies a storage-related criteria or other criteria (step 240), and performs an action or trigger event in response to the criteria being satisfied (step 245). For example, if a storage policy, rule, or other definition indicates that an SLA or other preference specifying a particular criteria, such as a storage threshold for a particular volume has been met, then the system may perform a corresponding action, such as migrating data from the volume to other storage to reduce usage on the volume to comply with the specified SLA range. As another example, the system could trigger an event when data is not adequately backed up across the enterprise, for example when only a single copy of data exists or is not adequately saved as other copies on other volumes as specified by a storage criteria. Such events may be based in whole or in part on any suitable SRM thresholds associated with primary data or HSM thresholds associated with secondary data (or vice versa).

In some embodiments, the system uses data from one or more storage operation cells may be used to advise users of risks or indicates actions that can be used to mitigate or otherwise minimize these risks, and in some embodiments, dynamically takes action to mitigate or minimize these risks. For example, a master storage manager 215 may include a variety of policies or definitions specifying storage-related risks, risk criteria, or other use tolerances with respect to storage of electronic data. For example, a policy may indicate that the primary volume should always maintain 20% free space, that snapshots of data on the primary copy should be taken every hour and stored on a secondary volume for at least 1 week, that backup data from a secondary volume should be aged and migrated to other storage after one month and retained for one year, etc. A policy might also indicate information related to an SLA or user preference.

For example, a policy may indicate that data on a secondary volume should always have a certain level of availability and be able to be restored within a given time period, that data on a secondary volume may be mirrored or otherwise migrated to a specified number of other volumes, etc. This may be determined for example, by autodiscovery techniques that make the system aware of the storage policies associated with each particular type of storage device within the network. Thus, when data is correlated from SRM, HSM, and other storage operation cells to identify and normalize relationships between hosts, storage volumes, and other network elements as previously described herein, the system identifies characteristics or other aspects of the data received that satisfy these types risk criteria. Thus the system might determine that primary copy A has only 15% free space left on its current storage volume and that a secondary storage volume storing snapshot data for primary copy A is unavailable and thus SLA criteria with respect to again primary copy A data is not being met.

In some embodiments, the system notifies the user of these conditions and may suggest (or automatically implement) solutions to mitigate or otherwise address or minimize the risks to the data. Thus, for example, the system would indicate that data from primary copy A should be migrated to secondary storage in order to free space on the storage volume and that snapshots of data should be routed or directed to an alternate or failover secondary storage volume while the other storage volume(s) are unavailable. In some embodiments, a storage manager component may also take actions or other steps to mitigate or otherwise address or minimize the risks to the data evidenced by the condition(s). Index data specified a in a risk criteria or other definition or criteria indicating actions to take in the event of certain risks or other conditions being indicated by data collected from the storage operation cell(s). In some embodiments, the system analyzes application configuration data to determine whether a risk is present. Thus, a risk might be present and a risk criteria satisfied if an Exchange server configuration or setup does not satisfy a model or exemplary configuration according to a storage policy or definition.

Figure 5:
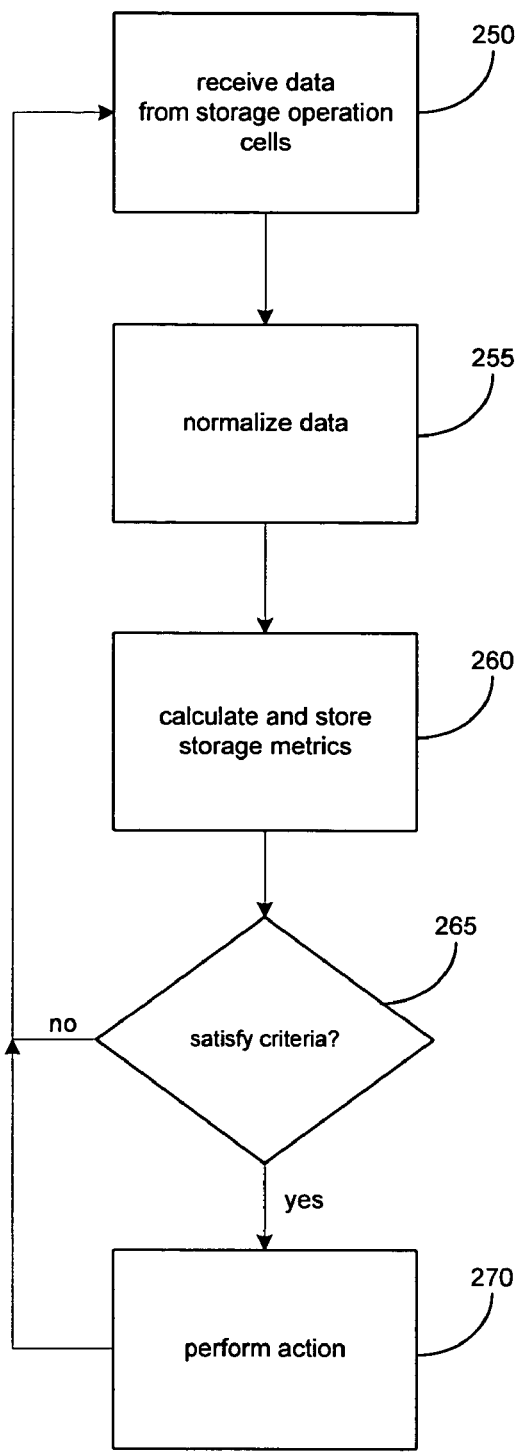
FIG. 5 is a flow diagram of a method to calculate storage metrics associated with storage operation cells according to an embodiment of the invention.

FIG. 5 presents a flow diagram of a method to calculate storage metrics associated with storage operation cells according to an embodiment of the invention. In some embodiments, data from storage operation cells is correlated against various storage metrics to generate an indication of a state of data storage in the system. Thus, for example, information about the number or age of backup copies, the availability of stored data, and other information related to data protection can be weighted to generate a storage metric for a level of data protection for primary copies, secondary copies, in network elements, etc.

The system receives data from storage operation cells, step 250, and may normalizes the data received, step 255. For example, a master storage manager or other storage manager receives information related to storage of electronic data in storage operation cells of the system. Information is received regarding data protection over time, space on storage volumes, data redundancy (such as a number of multiple copies being stored), failures and successes in storage operations, types of storage operations, recoverability time, migration level, compliance level, performance of data path, etc.

The system may generate and store an indication of a state of storage in the system, step 260. For example, information received may be assigned various weights or values according to criteria specified in the storage manager index. This information may then be manipulated or otherwise analyzed to generate a numerical indication of a storage related metric of the system. A primary volume with 50% free space may be allocated 2 points, error-free storage operations for the primary volume over a 12 hour period may be allocated 3 points, hourly snapshots of the primary volume data stored to secondary storage may be allocated 4 points, an availability time of 10 minutes may be allocated 2 points, and other storage-related criteria for a volume or data may be allocated additional metrics or values. Thus, a metric or other indication for a particular volume can be generated. Users can quickly determine levels of data protection or other storage-related criteria being quantified and tracked between volumes and other network elements. A user can determine whether data stored on one primary copy is better protected than data stored on another primary copy by comparing the storage metrics for the two volumes.

In some embodiments, the system may also determine whether a metric or other indication satisfies a particular storage criteria, step 265, and performs an action as a result, step 270. For example, as previously described, a storage policy or other definition might indicate that a storage manager should initiate an HSM-related storage operation if a storage metric or other indication drops below or otherwise fails to satisfy a specified criteria such as a threshold of data protection. In some embodiments, the values and other metrics, weights, or criteria given to information received from storage operation cells is related to metrics or other criteria specified in an SLA.

In some embodiments, risk factors or other data protection operations may be quantified into certain measurable service or risk levels for ease of comprehension. For example, certain applications and associated data may be considered to be more important by an enterprise than other data and services. Financial compliance data, for example, may be of greater importance than marketing materials, etc. Network administrators may assign priorities or "weights" to certain data or applications, corresponding to its importance (priority value). The level of compliance with the storage operations specified for these applications may also be assigned a certain value. Thus, the health, impact and overall importance of a service on an enterprise may be determined, for example, by measuring the compliance value and calculating the product of the priority value and the compliance value to determine the "service level" (sometimes referred to as a "Q-factor" in the CommVault Qinetix product) and comparing it to certain operational thresholds to determine if the operation is being performed within a specified data protection service level.

As mentioned above, the service level value may be used as a metric to determine how well data protection operations are functioning within a certain portion of a network such as a storage operation cell 50. It may also be viewed as point in time a measurement of data protection service level. Generally speaking, the data protection service level may be defined in terms of a range of varying time periods including short-term data protection operations (e.g., days, hours, weeks), near term data protection operations (e.g., weeks, months) and long-term data protection operations (e.g., months, years) or any combination of these depending on the service to be analyzed. For example, a data protection metric concerned only with short-term storage performance may be defined based mainly on the performance of short-term data operations. Conversely, a data protection metric concerned only with long-term storage performance may be defined based mainly on the performance of long-term data operations. A data protection metric concerned with overall or "composite" performance may be based on the performance of long-term, near term and short-term data operations. The emphasis or degree to which certain operations contribute to the value of metric may be chosen by a network to meet specific needs. For example, the performance of short-term data operations may contribute 70% of the data metric value whereas near term operations may contribute 20% and long-term operations may contribute 10% or vice versa depending on the desired emphasis in the metric. Such weights or contribution levels may be set by a user or network administrator.

Moreover, some embodiments may include preconfigured profile types based on the type of entity the system in managing. Thus, an administrator may indicate the type of business or entity using the storage system and the various storage metrics and parameters used to evaluate and otherwise indicate information regarding the health and other characteristics of the system may be automatically configured. In some embodiments, administrators may use these preconfigured settings as a baseline and further customize weightings and other criteria used to calculate storage metrics according to user preferences, business needs, SLAs, etc. For example, a network administrator may choose from a list of such profiles that may include for example. financial, medical, legal, etc., each having metric weights for various storage parameters preconfigured for that business type.

This feature is desirable in part because certain businesses have different storage needs, and the weights given to certain storage parameters, and thus the way in which one or more storage metrics are calculated may necessarily be somewhat different depending on business type. Assume, for example, the following storage parameters are used in calculating a storage metric: 1) data availability, 2) retention period, 3) protection level (number of copies), 4) disaster recovery level, hardware load, and 6) network load. A financial services company, a law firm, a hospital and a small retail business all may have somewhat different storage needs as represented according to these metrics. The financial services company may be very concerned with availability, protection level and disaster recovery level, whereas a hospital may be more concerned with retention period and hardware load. Thus, appropriate storage metrics for the hospital may emphasize retention period in its calculations (e.g., by heavily weighting this storage characteristic), whereas a financial services company may only assign retention period a mid-level weighting factor, etc. Similarly, a small business may care little about hardware and network load, but be concerned with availability, and thus weight these parameters accordingly. The law firm may want different weights on all parameters. Thus, by choosing parameter weights appropriately, the displayed storage metric may accurately reflect the overall health and performance of the storage system relative to business priorities, thus providing the user with a helpful indicia of the storage network operation and data protection level.

In some embodiments, the storage management system may include preconfigured business or entity profiles that are tailored to certain business or entity types that allow a user to choose a profile based on business or entity type without having any specific knowledge of storage or business needs. These preconfigured profiles may contain metric weights appropriate for the specified business or entity type. From the example above, a user may choose a financial services profile that specifies the appropriate weights for that business type. This relieves the user of the burden of becoming familiar with the specifics of the storage system or the businesses storage needs to configure the system. Moreover, in some embodiments, the system may include autodiscovery routines automatically seek out and evaluate the user's network and make profile recommendations based the particulars of that discovered network (either automatically or with some user input).

Generally speaking, in some embodiments, a short-term data protection service level may be computed by considering various short-term data protection aspects or considerations. For example, a priority may be assigned to each aspect on a predetermined scale (e.g., from 1 to 9, where 9 representing a service of least importance). After a priority is assigned, a weight for the aspect may be calculated as (10—Assigned Priority). In one embodiment, percentage points for each aspect may be calculated as weighted average among various aspects that are under consideration according to the following formula:

$$Sdp = Sslp * (Wa/\Sigma Wap) \qquad (2)$$

where Sdp is the short term data protection service level, Sslp is the is the short term data protection service level percentage, Wa is the weight for a certain aspect under consideration and Wap is the weight for all relevant short term data protection aspects (which may be summed).

Some of the various aspects that may be considered when computing the short -term data protection service level may include:

1. The threshold for not having any data protection operation in a given number of days. If no data protection operation has occurred in the past specified number of days, percentage points for this aspect may be subtracted from the total percentage points or otherwise taken into account when calculating short-term data protection service level.
2. The threshold for not having full data protection operation (e.g., a complete backup operation) in a given number of days. If there is no full data protection operation in the past specified number of days, percentage points for this aspect may subtracted from the total percentage points or otherwise taken into account when calculating short-term data protection service level.
3. The data protection cycle redundancy. If there is no redundancy in the data protection pathways, percentage points for this aspect may be subtracted from the total percentage points or otherwise taken into account when calculating short-term data protection service level.
4. Threshold for not encountering any failures in data protection operations in a given number of days. If one or more data protection operation failures is encountered in a specified period, percentage points for this aspect may be subtracted from the total percentage points or otherwise taken into account when calculating short-term data protection service level.

Similarly, long-term or near term data protection service level may be computed using the formula set forth above by taking various long-term/near term data protection aspects in to account which may include the following:

1. Weekly data protection for a given number of weeks (e.g., for calculating near term service level). If a data protection operation is missing in a week within the specified number of weeks, then the percentage points for this aspect may be subtracted from the total percentage points or otherwise taken into account when calculating long-term data protection service level.
2. Monthly data protection for a given number of months (e.g., for calculating near term or long term service level). If a data protection operation is missing in a month within the specified number of years, then the percentage points for this aspect may be subtracted from the total percentage points or otherwise taken into account when calculating long-term data protection service level.
3. Yearly data protection for a given number of years (e.g., for calculating near term or long term service level). If a data protection operation is missing in a year within the specified number of year, then the percentage points for this aspect are subtracted from the total percentage points or otherwise taken into account when calculating long-term data protection service level.

If an overall performance metric is desired, it may be computed according to the following equation:

$$Sop=(SF1)(Sdp)+(SF2)(Sntp)+(SF3)(Sltp) \quad (3)$$

where Sop is the overall performance, Sdp is the short term performance metric; SF1 is a scaling factor assigned to provide a certain weight to Sdp; Sntp is the near term performance and SF2 is the scaling factor assigned to provide a certain weight to Sntp; Sltp is the long term performance metric and SF2 is a scaling factor assigned to provide a certain weight to Sltp.

Furthermore, it will be understood from the foregoing that the such performance metrics may be calculated on a scalable basis such that many short-term, near term, or long-term or composite metrics representative of the performance or various portions of a network may be combined and aggregated as desired to obtain a service level performance values that represent the operational status of a large, small or intermediate size network.

Moreover, additional metrics different from the illustrative examples set forth above also be used if desired in the calculation of service level values. Some examples include: 1) disaster recovery, 2) storage utilization, 3) data migration level, 4) availability level, 5) compliance level, and 6) the number of available data paths, etc. may also be included in the calculation of a service level.

Figure 6:
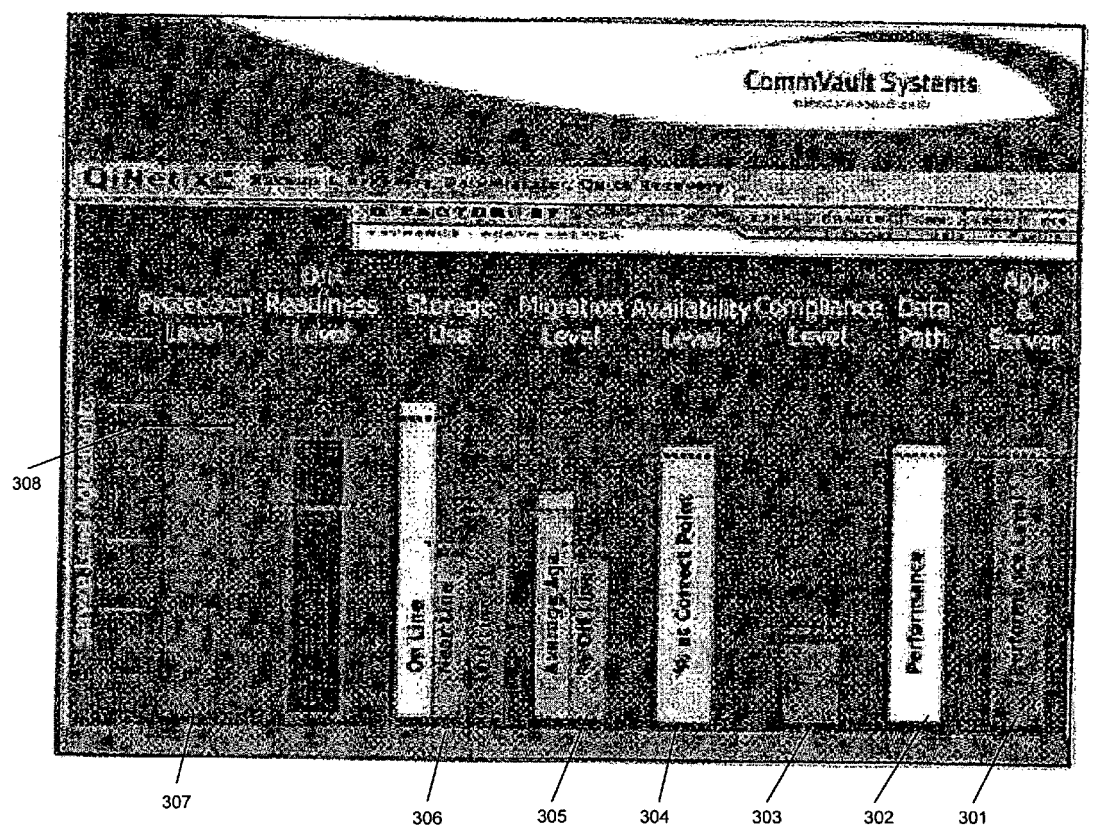
FIG. 6 illustrates an exemplary graphical representation illustrating level of certain performance metric in accordance with an embodiment of the invention.

If desired, these metrics may be arranged individually and presented in graphical form to the illustrate conformance level of each of these indicators rather than (or in addition to) being included in a certain metric as described above. For example, FIG. 6 presents a bar chart 300 that illustrates the calculated service level associated with each corresponding metric. For example, moving from left to right the following metrics are illustrated, application server level 301, data path level 302, compliance level 303, availability level 304, migration level 305, storage use 306, and overall protection level 307. The desired service level for each metric is illustrated by the dotted lines 308. If the bar graph for a particular metric is below dotted line 308, the service is underperforming, if at or above dotted line 308, the service meets or exceeds expectations. In some embodiments, users may establish the desired service level for each metric through the user interface of FIG. 7 (described in more detail below).

Some of the factors considered in calculating service 301 may include data transfer rate throughput and congestions levels. Data path level 302 may be calculated taking into consideration the number of available different data paths, SAN configuration and reporting, and backup network performance. Compliance level 303 may be calculated taking into consideration data path encryption, encryption security, searchability of data and the degree to which the data is indexed. Availability level 304 may be calculated taking into consideration where data is stored and how fast it may be retrieved. Migration level 305 may be calculated by taking into consideration the state of secondary copies, the age of the secondary copies and the level of migration. Storage use level 306 may be calculated by taking into consideration HSM and SRM storage use, and overall protection level 307 may be calculated by taking into account all or some of the foregoing factors based on system or enterprise needs.

Figure 7:
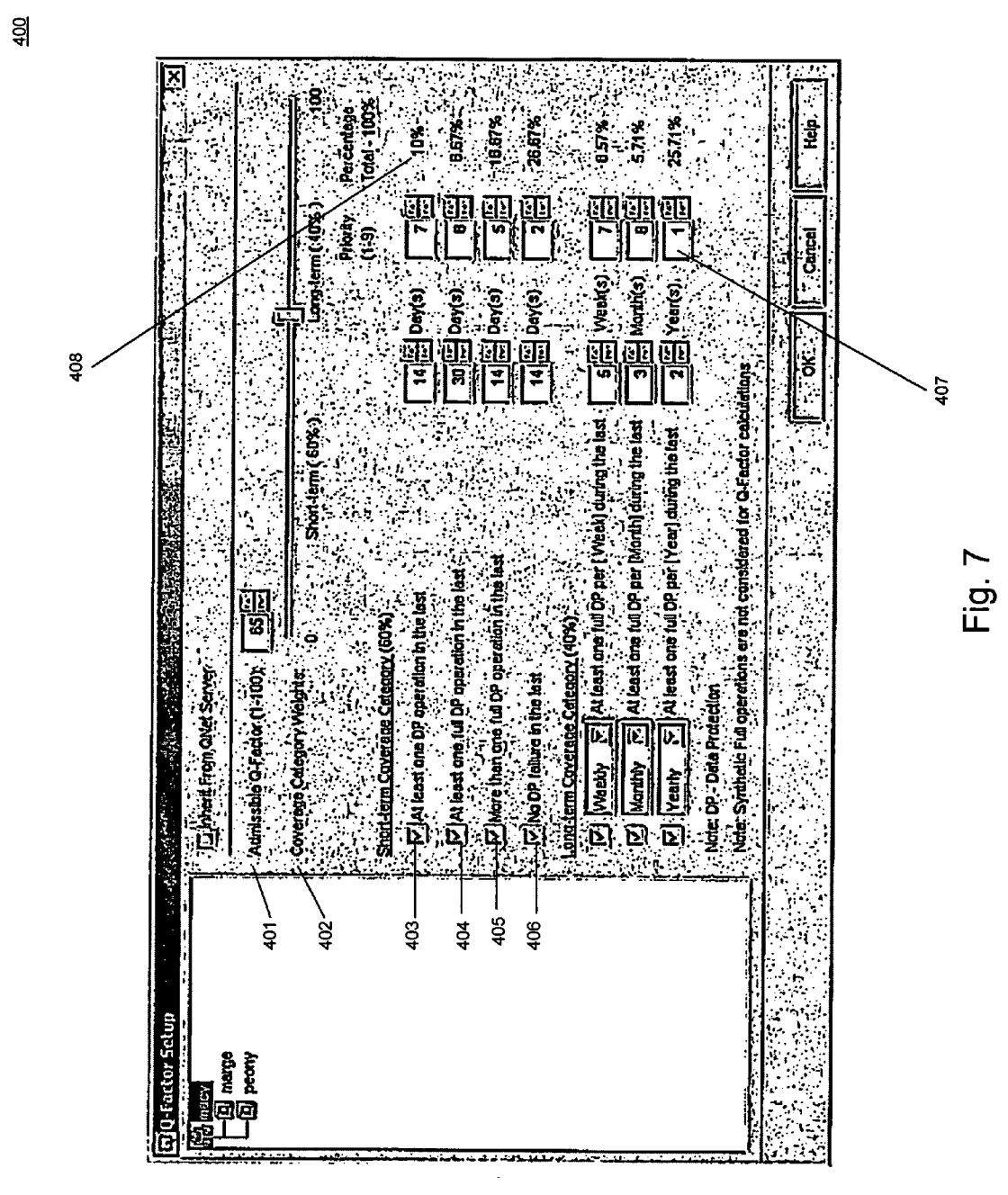

In accordance with one aspect of the present invention, network administrators or other users may specify parameters associated with data protections through a graphical user interface such as the one depicted in FIG. 7. As shown, Interface 400 may include various user-defined or user-selectable fields relating to permissible values of ranges for data protection parameters for short and long term storage. Such an interface may include, for example, fields for entering the acceptable overall service level (field 401, e.g., a storage metric), the weights assigned to the category of coverage (short term or long term, field 402), certain short term storage parameters which specify operations such as the time period in which at least one data protection operation is performed (field 403), time period in which the last full data operation is performed (field 404), time period in which more than one full data protection operation is performed (field 405), and the time period in which there has been no data protection failure (field 406). Each of the fields may also be assigned a priority level through interface 400 (generally labeled field 407). The percentage each factor contributes to the storage metric is displayed in field 408. Moreover, as shown, interface 400 may also include fields for activating or deactivating such fields to control whether such parameters are actually used in calculating a particular service level.

Figure 8:
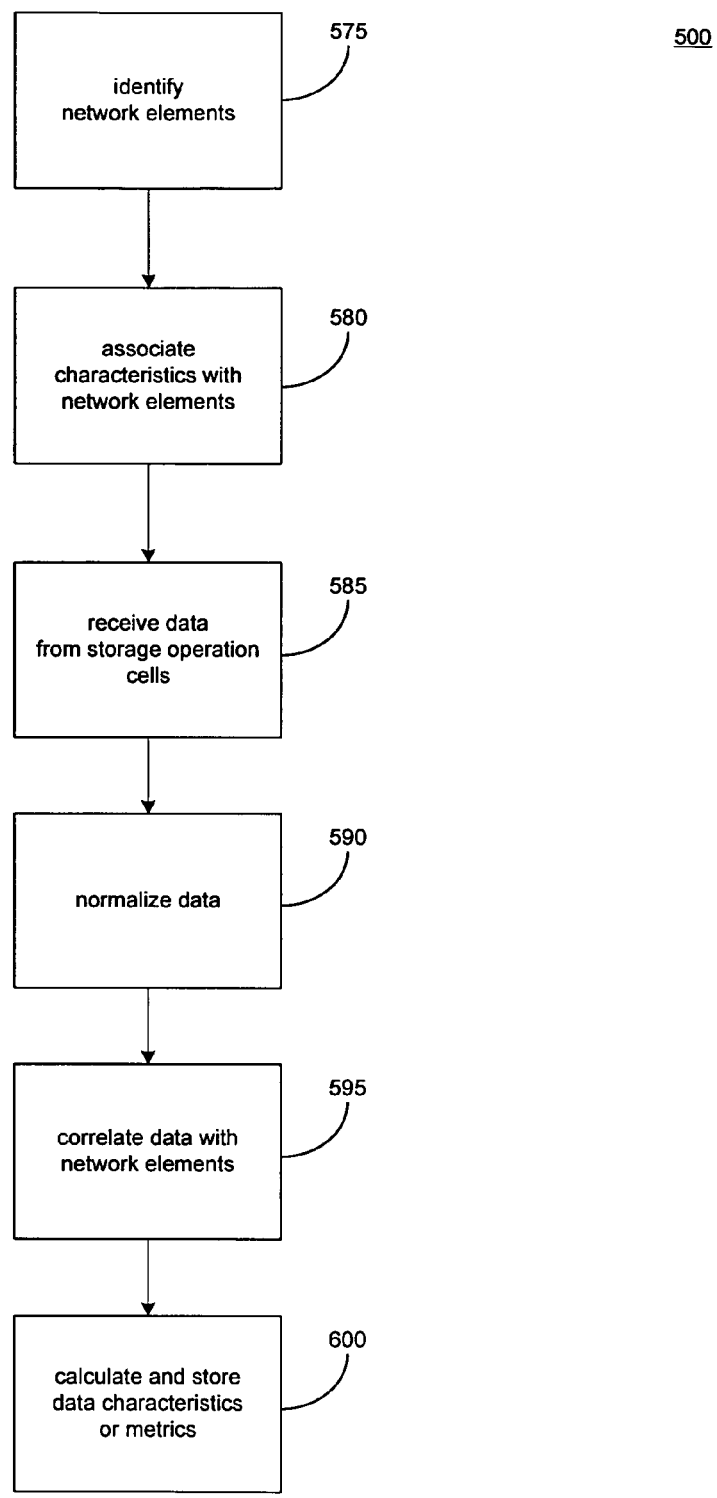
FIG. 8 is a flow diagram of a method to calculate data costing and data availability associated with storage operation cells according to an embodiment of the invention.

FIG. 8 presents a flow diagram generally illustrating a method to calculate data costing and data availability associated with storage operation cells according to an embodiment of the invention. Data received from storage operation cell 50 may used in conjunction with hardware-related information and other information about network elements to generate indications of costs associated with storage of particular data in the system or the availability of particular data in the system.

At step 575, certain network elements such as storage volumes, storage devices, computers, switches, routers, bridges, SANs, cabling, and other types of network infrastructure, may be identified. In some embodiments, information regarding network elements is manually obtained, for example as input by a system administrator or from a supplied configuration file. In other embodiments, information regarding network elements may be dynamically obtained or generated. For example, a storage operation cell may contain network element detection software or other modules that dynamically perform network discovery operations to locate and identify network elements. In various embodiments, network element discovery may occur according to a predefined schedule, at startup, or whenever a new network element is incorporated or otherwise associated with a storage operation cell in the system. In some embodiments, storage operations cells throughout the storage operation cell hierarchy may propagate network element discovery information to a master storage manager for update.

At step 580, characteristics or metrics associated with the network elements may be identified. A storage manager index may contain characteristics or metrics associated with information identifying potential network elements. Thus, the system may receive information identifying a particular network element and then associate information such as a characteristic or metric with that network element for further use generating an indication of storage cost or data availability. For example, a tape storage device might be associated with a storage cost of 3 cents/MB and a data availability level of 40 MB/sec. A section of fiber optic cabling could be associated with a throughput speed of 3 Gbits at a particular cost, etc.

As previously described herein, the system may also receive other data from storage operation cells (step 585), and may normalize the data (step 590). For example, a master storage manager may receive and normalize SRM and HSM information. Exemplary information may include volume information, user information, business logic information such as department or project identifier or association, etc. Information from an SRM storage operation cell may be received indicating that a primary copy A (or subsets of data associated with primary copy A such as a files, folders, mailboxes, etc.) belongs to the marketing department and is used by three users A, B, and C. User A may generate 70 percent of the data on primary copy A. Primary copy A may be stored on primary volume A and may relate to data from host A. Host A may correspond to HSM storage operation cell host B. Primary volume A may correspond to primary volume B and which is backed up to secondary storage volume C.

The additional data received from the storage operation cells may be correlated at step 585 with the network element information from steps 575 and 585 (step 595). For example, it may be determined that a hard drive from step 575 corresponds to the storage volume for primary copy A used by users A, B, and C of the marketing department. Primary copy A data from the hard drive may be backed up to a tape drive also discovered in step 575. The system also correlates that the snapshot information or other backup information received from an HSM storage operation cell regarding a secondary storage volume corresponds to the tape drive.

Thus, the system generates and stores data characteristics and metrics associated with the network elements of step 575 and the additional information received from the network cells in step 575 (step 600). For example, knowing that primary copy A of the marketing department is stored on a hard drive allows the system to generate a storage cost for the marketing department primary copy data based on information generated in step 580. A cost per megabyte for primary storage of the marketing department may be calculated and allocated among various users according to additional information received about use patterns by particular users. A particular user can be monitored, blocked, or restricted etc. according to data usage thresholds or other criteria. Additionally, the secondary storage costs of marketing department data can also be generated since the primary volume data may be correlated to secondary storage elements using the SRM and HSM data.

Exemplary information generated could include how fast a particular department is using up available storage space, how long data would take to recover over a particular network pathway from a particular secondary storage device, costs over time, etc. The system may, for example, calculate based on network element and pathway information and metrics across the enterprise, whether a particular SLA is being met with respect to recovery times for marketing department data, data of a particular user, data for a particular project, etc. In some embodiments, media usage may be predicted according to data use, availability, or cost. For example, a pattern of use by the marketing department may predict or otherwise indicate that the primary copy A will need to be migrated to a larger primary storage volume in the next 6-8 months at a particular cost per MB.

Moreover, in some embodiments, such information may be used to determine or predict the overall cost associated with the storage of certain information. The cost associated with hosting a certain application may be based, at least in part, on the type of media on which the data resides. For example, an Exchange Server may be provisioned with 200 GB as primary storage and 2 TB of secondary storage. The storage of data on each type of storage media may be assigned a certain cost parameter such than overall cost may be calculated. For example, the cost of storing data on primary storage may be 20 cents per Megabyte, primary storage such as LTO may have a 15 cents per Megabyte storage cost and secondary storage such as DLT may have a 10 cents per Megabyte Storage cost. Thus, overall cost associated with the Exchange Server application may be calculated by multiplying the amount of data stored on each media type by its associated cost and adding the results to obtain the sum. This allows network administrators to quickly and accurately determine the current cost of particular application as well as to predict the cost of continuing to host the application as it grows (or becomes smaller).

This method may also be used to determine storage cost of over a period of time. For example, the amount of data stored on a certain media may change pursuant to, among other things, a storage policy and fluctuations in application activity. Cost over a specified time period may be calculated such that it takes into account the movement of data from a more expensive storage medium to a less expensive one as well as any increase in cost due to any change in the amount of storage required to service an application. This may be done, for example by multiplying cost by capacity over a specified period of time.

The costing feature of the present invention may include an interface console or other graphical display that allows users to display and determine costs associated with a particular application. Such a console may allow a user to select (and possibly combine) certain applications to determine the storage cost associated with that application. For example, the console may include a desktop with icons or other indictor representing certain applications. A user may, for example, click on one of these applications, and determine data storage costs (or other information by selecting various options from a pull down menus). The interface may also allow the user to combine certain application together to obtain an overall performance cost to drill down to particulars within that application to determine costs associated with a particular aspect of that application (not shown).

Moreover, the costing interface of the present invention may include fields that permit associations for creating a billable entity for allocating costs based on data use. For example, if three different groups such marketing, sales and accounting, access the same data, the cost for maintaining that data may be divided among them depending, on certain criteria such as frequency of use. Thus, for example, if sales uses the application 80% of the time while marketing an accounting only use the application 10% of the time, the cost of maintaining the application may allocated accordingly. Such allocations may be performed manually, or automatically (for example, at step 595).

Moreover, storage devices may be assigned to a particular cost category which is indicative of the cost of storing information on that device. For example, a network may employ many different types of storage devices each of which may have a different associated cost. By assigning each device to a different cost category, the system may determine, based on device identity, the cost associated with storing data on that device. Thus, costing categories allow user to quickly determine the overall cost associated with certain data as it evolves through its lifecycle. It also allows user to accurately predict the cost associated with a proposed or anticipated storage operations based on the storage resources to be used. Moreover, certain billable entities may be charged appropriately based the capacity of a storage device used by that entity.

Figure 9:
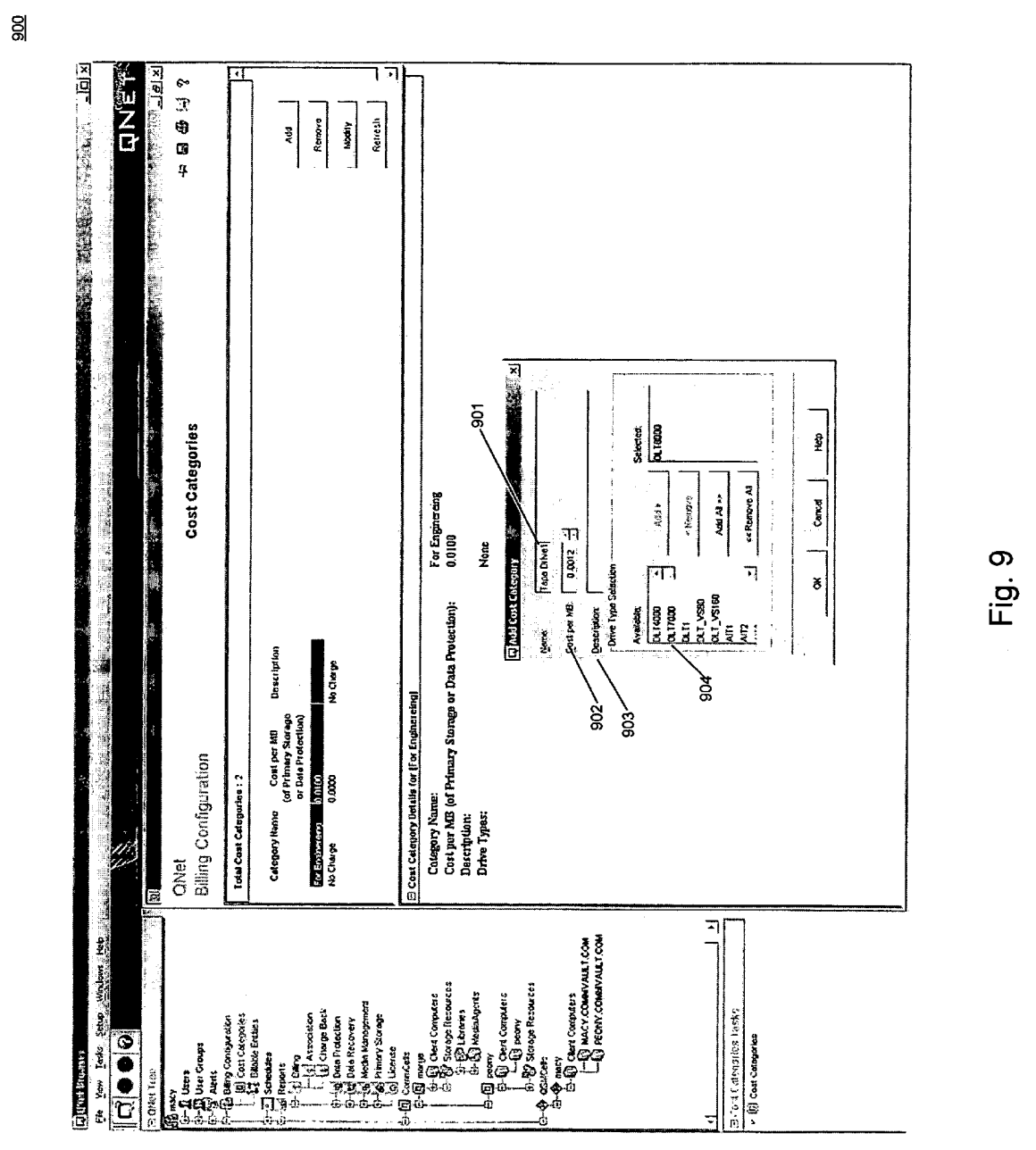

FIG. 9 shows a console 900 suitable for allowing system users to create cost categories. As shown, cost console 9 may include a name field 901, a cost per unit of storage field 902, a description field 903 and available device field 904. In operation a, user may select a storage device from field 904 (which may be automatically populated with network devices using auto-discovery techniques) and assign a cost to that device. Alternatively, default costs may be assigned to the detected network devices from a database containing such information. Moreover, if desired, a user may customize the characteristics of devices by altering the default values, or by entering new network devices in name field 901 and specifying cost values.

Figure 10:
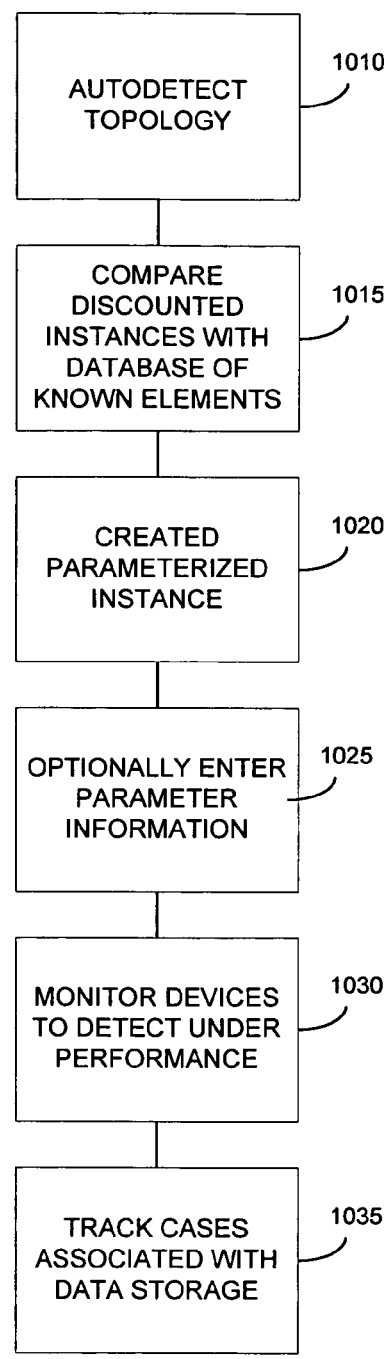
FIG. 10 is a flow diagram illustrating some of the steps involved in determining the cost of data storage in accordance with one embodiment of the present invention.

Referring to FIG. 10, some of the steps involved in automatically assigning cost categories may be as follows. Autodetect the network topology including the various storage devices and storage media for a given network, which may be a subset of a larger network (step 1010). In some embodiments, this may involve the creation of network topology model. Next, the identification of each discovered storage device may be compared to a database of known elements to determine if there are matches (step 1015). The information in the database may include cost information, failure rate, throughput and other performance metrics. Assuming matches are found, the information in the database is correlated with the model of the network topology to create particularized or parameterized instances of the discovered devices in the topology or model (step 1020). At step 1025, a user may manually input parameter information into the topology for storage devices not found in the database. Once the model/topology is created the system may monitor the devices to determine if the device is underperforming or otherwise deviating from expected baselines or thresholds (step 1030). For example, the system may monitor device throughput according to values associated with each device as populated in the topology model and trigger alerts or take other corrective actions if throughput falls below a given level or other value for a particular device or data path. Similarly, during the auto-discovery phase, an expected failure rate for storage operations for a particular device may be specified and the system will trigger alerts or take other corrective action (e.g., failing over storage operations to an alternate device) in the event that failure rates for the particular device exceed the specified expected failure rate. At step 1035, the system may continue to monitor the network to track the costs associated with data storage and use as further described herein.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for displaying data from storage operation cells, the method comprising:
    at a parent storage operation cell, receiving data associated with a condition of a first storage operation cell, the first storage operation cell being arranged as a child cell to the parent storage operation cell in a hierarchy of storage operation cells, the data including at least a first identifier associated with a first storage resource, the first storage operation cell comprising at least a storage manager component and the first storage resource;
    at the parent storage operation cell, receiving data associated with a condition of a second storage operation cell comprising a second storage resource, the second storage operation cell being arranged as a child cell of the parent storage operation cell in the hierarchy of storage operation cells, the data including at least a second identifier associated with the second storage resource;
    determining whether the first identifier is distinguishable from the second identifier;
    upon determining that the first identifier is not distinguishable from the second identifier, generating a third identifier and associating the third identifier with the first storage resource, wherein the third identifier is distinguishable from the second identifier; and
    displaying the data associated with the first and second storage operation cells, the displayed data including at least the second or third identifier.

2. The method of claim 1, wherein the first storage resource is a primary data storage device and the second storage resource is a secondary storage device.

3. The method of claim 2, wherein the primary data storage device stores a production copy of data and the secondary storage device stores a backup copy.

4. The method of claim 1, wherein the first storage resource is a hierarchical storage management resource and the second storage resource is a storage resource management resource.

5. The method of claim 1, wherein the first storage operation cell further comprises a data agent and a media agent.

6. The method of claim 5, wherein the first storage operation cell further comprises a client and a management agent.

7. The method of claim 1, further comprising simultaneously displaying the data associated with the first and second storage operation cells in a management console.

8. The method of claim 1, wherein the third identifier of the first storage resource is a name associated with a client device.

9. The method of claim 1, wherein the third identifier is automatically generated when a new component is associated with a network including the first and second storage resources.

10. The method of claim 1, wherein the identifier third is not used by another storage resource in a network including the first and second storage resources.

11. A method for performing a storage operation in a storage operation cell, the method comprising:

receiving data associated with a condition of a first storage operation cell, the data including at least a first identifier identifying a first storage resource within the first storage operation cell, the first storage operation cell comprising at least a storage manager component and the first storage resource;

receiving data associated with a condition of a second storage operation cell, the data including at least a second identifier identifying the first storage resource within the second storage operation cell, wherein the first and second storage operation cells are logically separate but share at least the first storage resource;

at a third storage operation cell hierarchically related as a parent to the first and second storage operation cells, determining whether the first identifier is distinct from the second identifier;

upon determining that the first identifier is distinct from the second identifier, generating a third identifier uniquely identifying the first storage resource within the third storage operation cell;

determining whether the data associated with the condition of the first storage operation cell satisfies a storage-related criterion; and upon determining that the data associated with the condition of the first storage operation cell satisfies the storage-related criterion, performing a storage operation based at least in part upon the determination.

12. The method of claim 11, wherein the storage-related criterion is defined in relation to a predefined storage policy, the storage policy comprising a data structure that further comprises a set of preferences for performing a storage operation.

13. The method of claim 11, wherein the storage-related criterion is a storage threshold for the first storage resource, and wherein the storage threshold defines at least two parameters selected from a group consisting of data availability, retention period, protection level, disaster recovery level, hardware load, and network load.

14. The method of claim 13, further comprising migrating data from the first storage resource to another storage resource to reduce usage at the first storage resource based on the storage-related criterion.

15. The method of claim 14, wherein the storage-related criterion is defined in a service level agreement.

16. The method of claim 11, wherein the storage-related criterion defines a number of secondary copies of the first storage resource.

17. The method of claim 11, wherein the storage-related criterion defines that no secondary copy of the first storage resource exists.

18. The method of claim 11, wherein the storage-related criterion is based at least in part on a storage resource management threshold associated with a primary data resource or a hierarchical storage management threshold associated with a secondary data resource.

19. The method of claim 11, wherein the storage operation is the performance of an action.

20. The method of claim 11, wherein the storage operation is the triggering of an event.

* * * * *

UNITED STATES PATENT AND TRADEMARK OFFICE
CERTIFICATE OF CORRECTION

PATENT NO. : 7,343,453 B2
APPLICATION NO. : 11/120619
DATED : March 11, 2008
INVENTOR(S) : Prahlad et al.

It is certified that error appears in the above-identified patent and that said Letters Patent is hereby corrected as shown below:

In column 10, line 16, before "index" delete "a" and insert -- an --, therefor.

In column 14, line 60, delete "desired," and insert -- desired. --, therefor.

In column 21, line 26, after "specified" delete "a".

In column 31, line 1, in Claim 10, delete "identifier third" and insert -- third identifier --, therefor.

Signed and Sealed this

Twenty-ninth Day of July, 2008

JON W. DUDAS
*Director of the United States Patent and Trademark Office*